(12) United States Patent
Maekawa et al.

(10) Patent No.: US 8,255,979 B2
(45) Date of Patent: *Aug. 28, 2012

(54) IMAGE DATA PROCESSING SYSTEM, IMAGE DATA GENERATING APPARATUS, TERMINAL EQUIPMENT AND PROGRAM PRODUCT

(75) Inventors: Yohei Maekawa, Aichi (JP); Kiyotaka Ohara, Aichi (JP); Koshi Fukazawa, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 457 days.

This patent is subject to a terminal disclaimer.

(21) Appl. No.: 11/979,823

(22) Filed: Nov. 8, 2007

(65) Prior Publication Data
US 2008/0104519 A1    May 1, 2008

Related U.S. Application Data

(63) Continuation of application No. 10/703,433, filed on Nov. 10, 2003, now Pat. No. 7,313,698.

(30) Foreign Application Priority Data

Dec. 27, 2002  (JP) ................................. 2002-380589
Jan. 6, 2003   (JP) ................................. 2003-000152
Jul. 17, 2003  (JP) ................................. 2003-275824

(51) Int. Cl.
*H04L 29/06*    (2006.01)
(52) U.S. Cl. .............................. 726/4; 726/3
(58) Field of Classification Search .................. 713/160, 713/161, 167
See application file for complete search history.

(56) References Cited

U.S. PATENT DOCUMENTS

| 6,092,104 | A  | 7/2000  | Kelly           |
|-----------|----|---------|-----------------|
| 6,130,757 | A  | 10/2000 | Yoshida et al.  |
| 6,487,609 | B1 | 11/2002 | Blackwood et al.|
| 7,130,066 | B1 | 10/2006 | Kanematu        |
| 7,155,522 | B2 | 12/2006 | Iyoki           |
| 2001/0040692 | A1 | 11/2001 | Matsueda et al. |
| 2001/0052995 | A1 | 12/2001 | Idehara         |
| 2002/0003548 | A1 | 1/2002  | Krusche et al.  |
| 2002/0024685 | A1 | 2/2002  | Sasaki et al.   |

(Continued)

FOREIGN PATENT DOCUMENTS

EP    0 887 994 A1    12/1998

(Continued)

OTHER PUBLICATIONS

Crawford, "Faxing in Windows XP", Oct. 2002, Retrieved from the Internet on Jan. 30, 2011: <URL: http://www.microsoft.com/windowsxp/using/setup/learnmore/crawford_02october21.mspx>.*

*Primary Examiner* — Minh Dinh
(74) *Attorney, Agent, or Firm* — Oliff & Berridge, PLC

(57) ABSTRACT

In each of personal computers, information concerning an application software to process image data sent to a scanner is received. A dialog box is displayed and a user entry is made as to whether transmission is permitted or not. When transmission is rejected by the user, a notice of the rejection of transmission is given to the scanner. When transmission is permitted by the user, the application software is started and a notice of the permission of transmission is given to the scanner. Then, image data is received from the scanner and processed by the started application software.

13 Claims, 23 Drawing Sheets

U.S. PATENT DOCUMENTS

| | | |
|---|---|---|
| 2002/0048049 A1 | 4/2002 | Ejiri |
| 2003/0011644 A1 | 1/2003 | Bilsing et al. |
| 2004/0153516 A1 | 8/2004 | Maekawa et al. |

FOREIGN PATENT DOCUMENTS

| | | |
|---|---|---|
| EP | 0 932 291 A1 | 7/1999 |
| EP | 1 204 042 A1 | 5/2002 |
| JP | A 07-156514 | 6/1995 |
| JP | A 9-311838 | 12/1997 |
| JP | A 10-191071 | 7/1998 |
| JP | A 10-320341 | 12/1998 |
| JP | A 2000-083232 | 3/2000 |
| JP | A 2000-092121 | 3/2000 |
| JP | A 2001-024685 | 1/2001 |
| JP | A 2001-117692 | 4/2001 |
| JP | A 2001-117838 | 4/2001 |
| JP | A 2001-154823 | 6/2001 |
| JP | B2 3257895 | 12/2001 |
| JP | A 2002-032303 | 1/2002 |
| JP | A 2002-091839 | 3/2002 |
| JP | A 2002-132407 | 5/2002 |
| JP | A 2002-232637 | 8/2002 |
| JP | A 2002-358280 | 12/2002 |
| JP | A 2003-044287 | 2/2003 |
| JP | A 2003-134282 | 5/2003 |
| JP | A 2004-213397 | 7/2004 |
| JP | A 2004-214854 | 7/2004 |

\* cited by examiner

FIG. 3A

| TRANSMISSION DESTINATION | APPLICATION | IP ADDRESS | PORT NO. | TIME-OUT VALUE | REGISTRATION VERIFICATION INFORMATION (ENCRYPTED) |
|---|---|---|---|---|---|
| PC1 | SCAN TO EMAIL | 10. 134. 43. 35 | 11111 | 1:00 | *+**+ |
| | SCAN TO IMAGE | | | 1:00 | |
| | SCAN TO OCR | | | 1:00 | |
| PC2 | SCAN TO IMAGE | 10. 134. 43. 36 | 12345 | 1:00 | +***+* |
| PC3 | SCAN TO IMAGE | 10. 134. 43. 37 | 11222 | 1:00 | — |
| | SCAN TO OCR | | | 1:00 | |
| USB | SCAN TO EMAIL | | | 1:00 | *****+* |
| | SCAN TO IMAGE | | | 1:00 | |
| | SCAN TO OCR | | | 1:00 | |
| PARALLEL | SCAN TO OCR | | | 1:00 | *++*+* |

FIG. 3B

| TRANSMISSION DESTINATION | APPLICATION | IP ADDRESS | PORT NO. | TIME-OUT VALUE | REGISTRATION VERIFICATION INFORMATION (ENCRYPTED) |
|---|---|---|---|---|---|
| PC3 | SCAN TO IMAGE | 10. 134. 43. 37 | 11222 | 1:00 | — |
| | SCAN TO OCR | | | 1:00 | |
| USB | SCAN TO EMAIL | | | 1:00 | ******+* |
| | SCAN TO IMAGE | | | 1:00 | |
| | SCAN TO OCR | | | 1:00 | |

(CONTINUED)

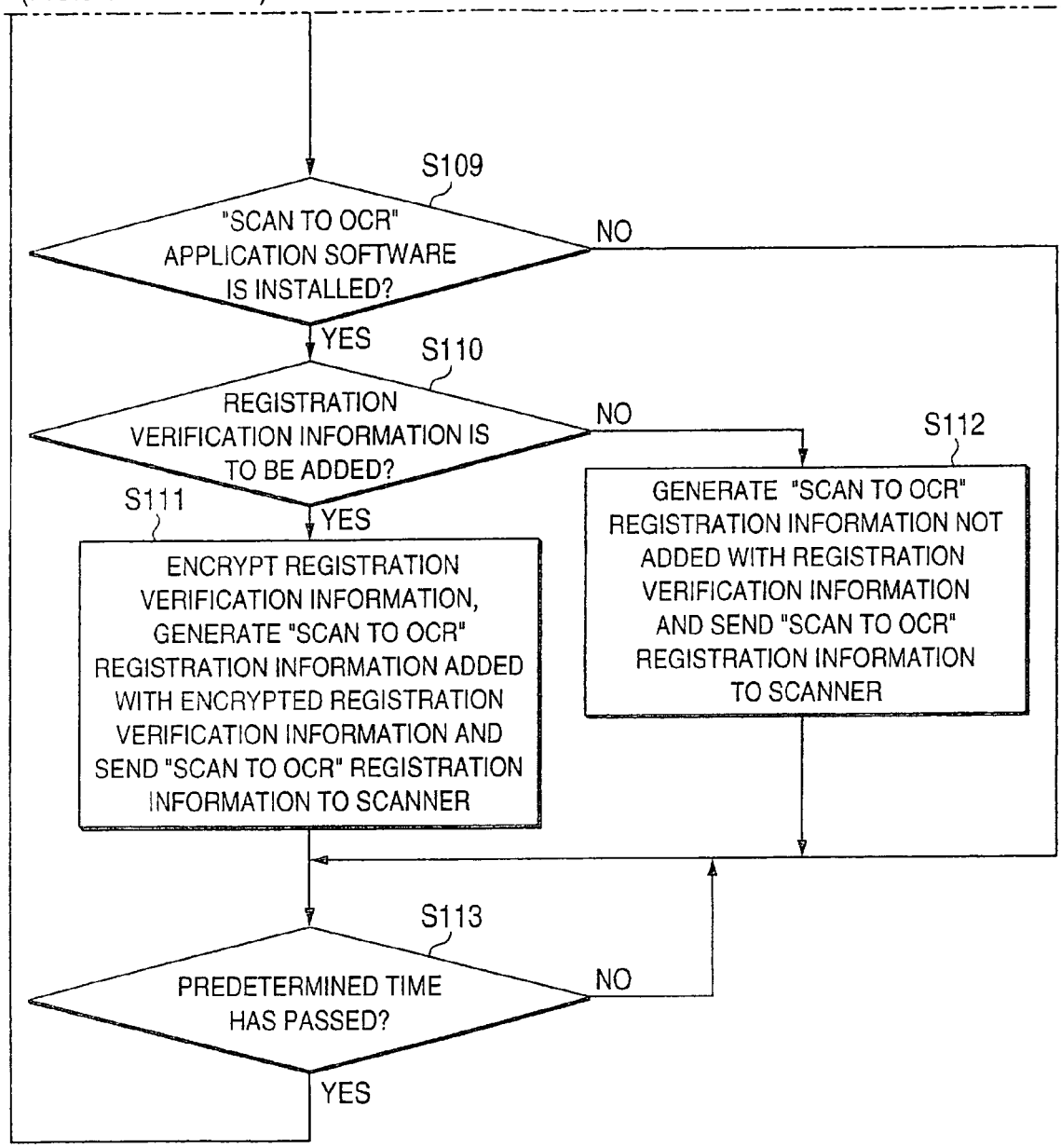

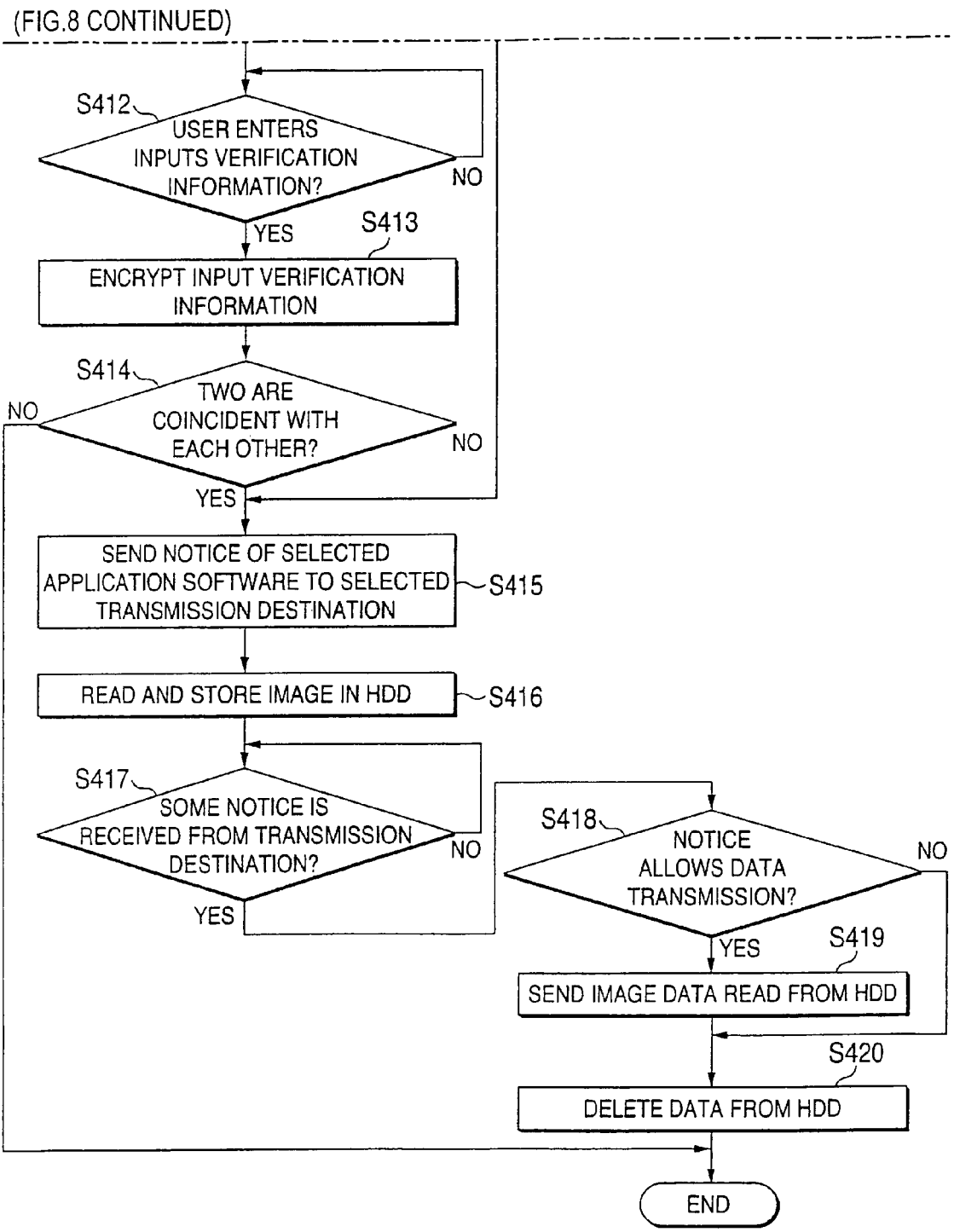

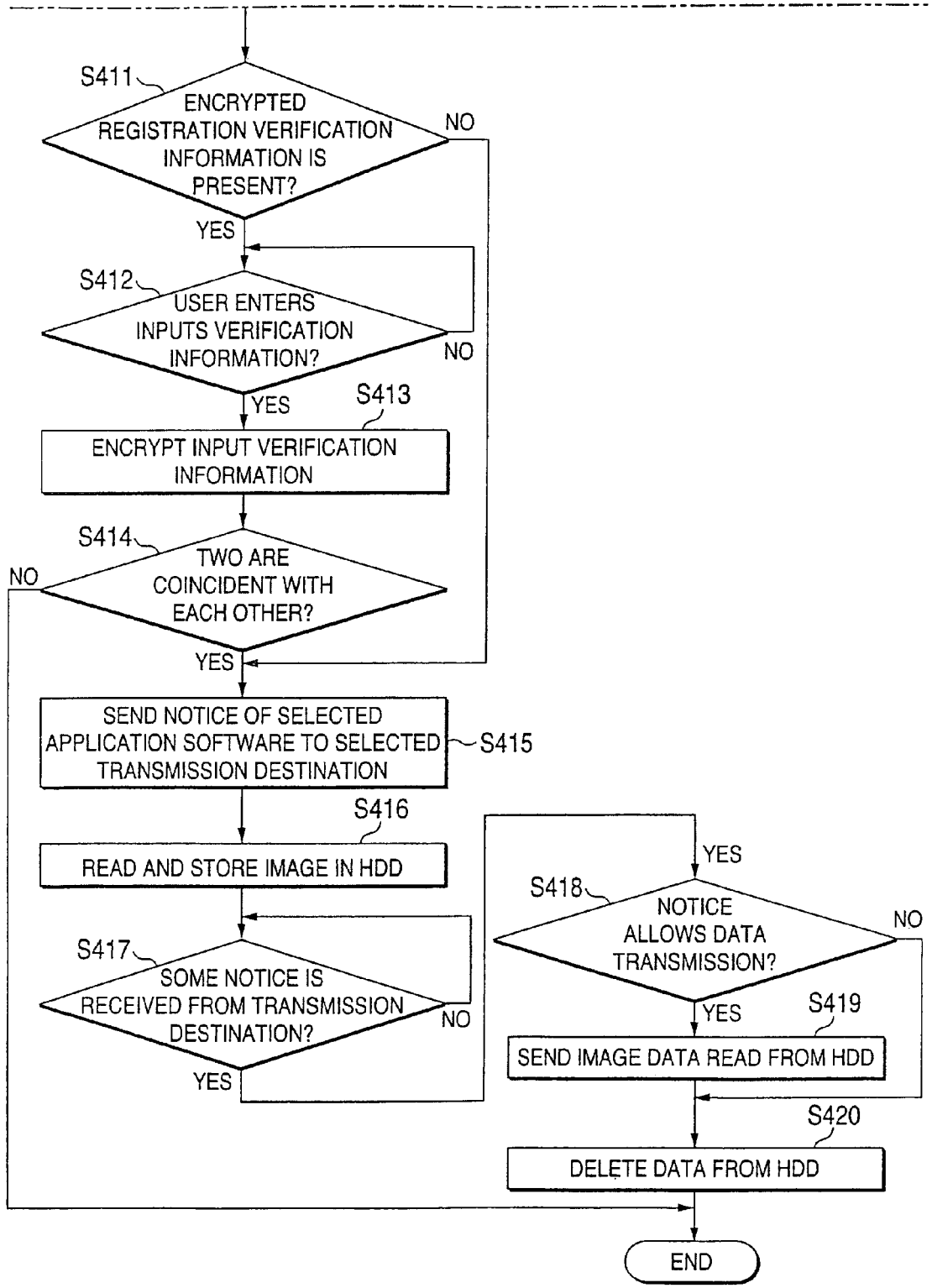

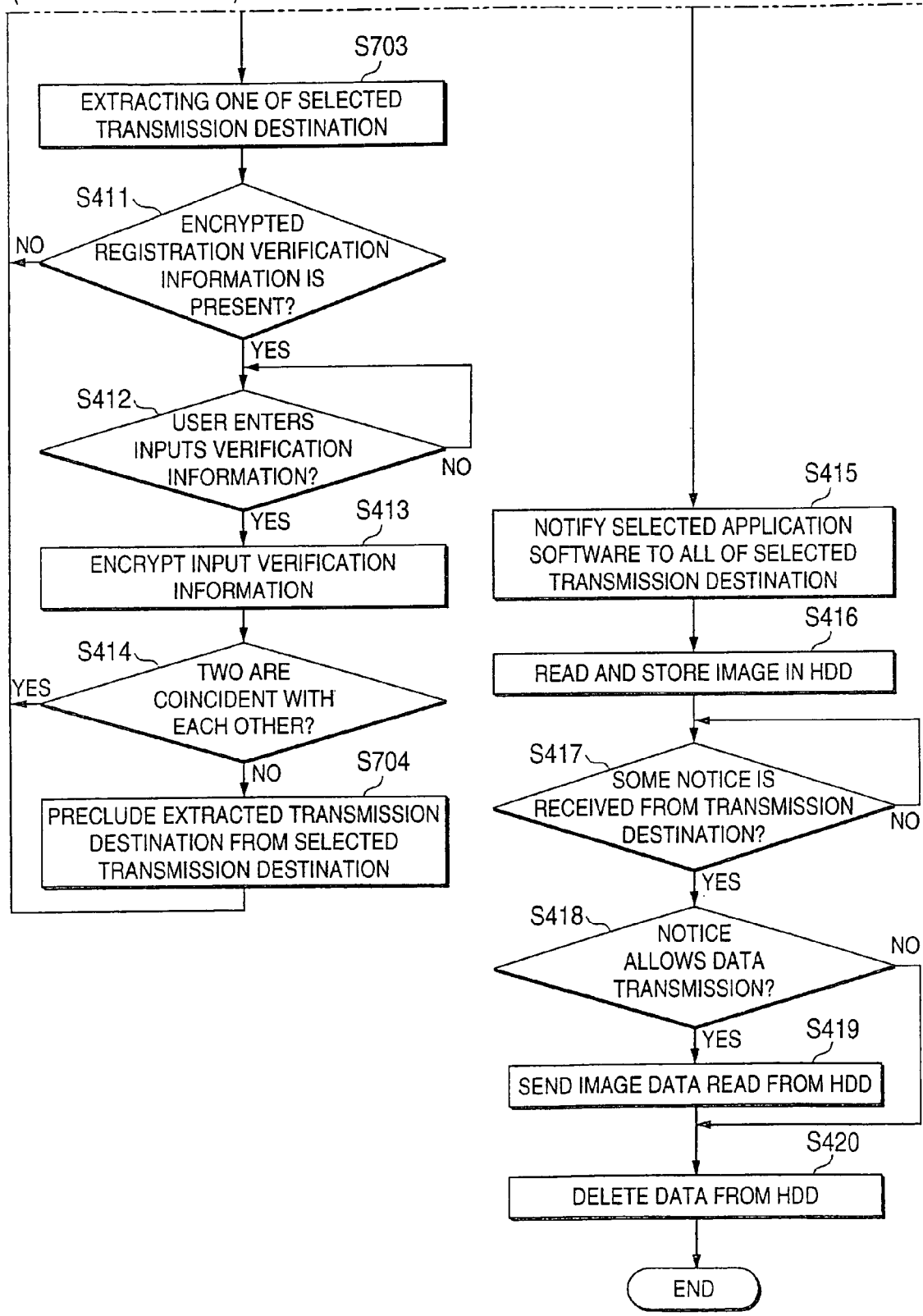

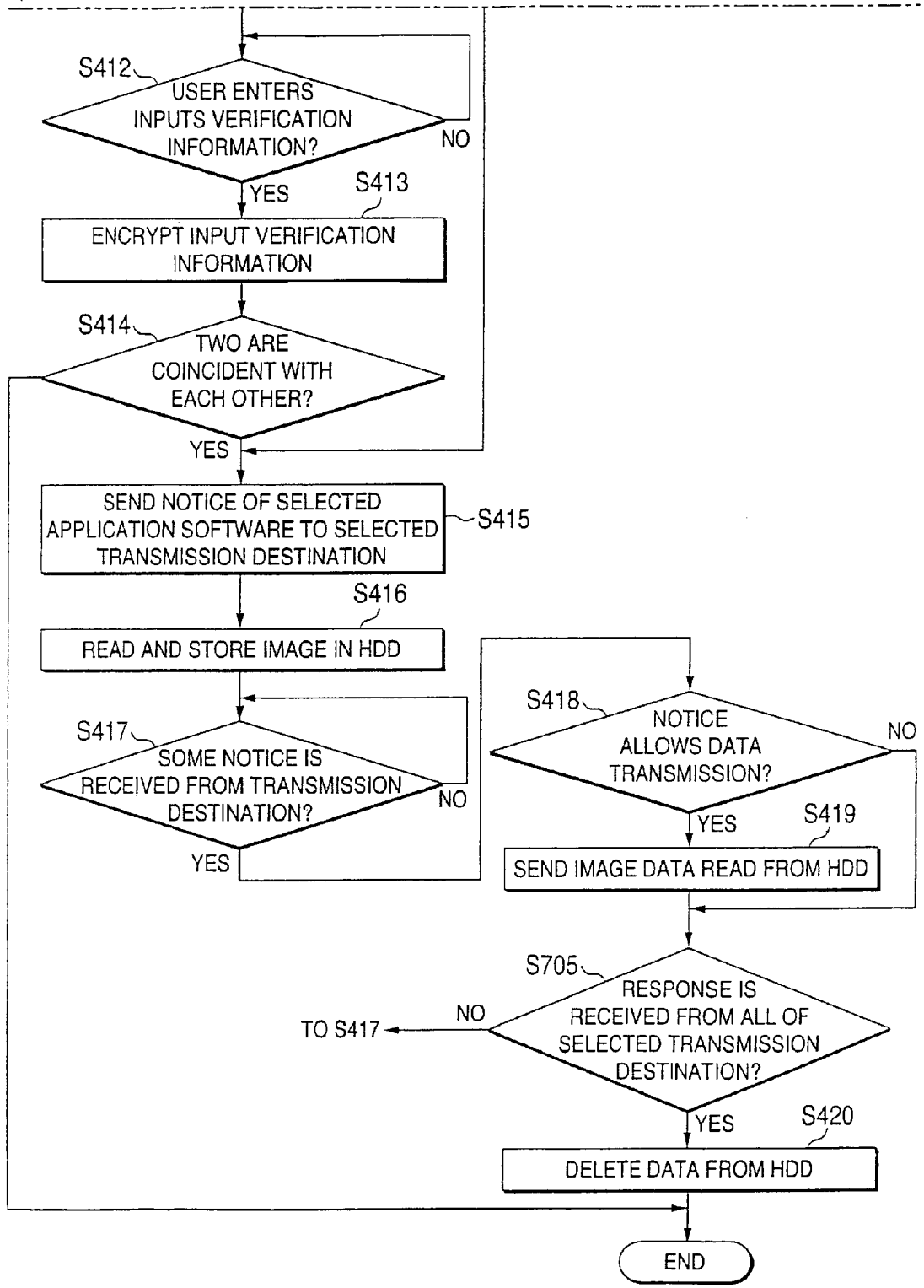

IMAGE DATA PROCESSING SYSTEM, IMAGE DATA GENERATING APPARATUS, TERMINAL EQUIPMENT AND PROGRAM PRODUCT

This is a Continuation of application Ser. No. 10/703,433 filed Nov. 10, 2003. The entire disclosure of the prior application is hereby incorporated by reference in its entirety.

BACKGROUND OF THE INVENTION

1. Field of the Invention

The present invention relates to an image data processing system, an image data generating apparatus, a terminal equipment and a program product, in which the terminal equipment receives data from the data generator and processes the data by using an application software installed in the terminal equipment.

2. Description of the Related Art

Conventionally, a network system including a multifunctional peripheral equipment having a plurality of functions such as a scanner function, and a plurality of terminal equipments (e.g., personal computers) connected to the multifunctional peripheral equipment through an LAN (Local Area Network) may be constructed. There has been used a technique in which data of an original read by the scanner function of the multifunctional peripheral equipment is sent to a terminal equipment designated by a user (e.g., see JP-A-2000-92121, specifically FIGS. 6 and 7 thereof). There also has been provided a number of application software operated on a terminal equipment for adding received data to an e-mail, editing the received data and recognizing characters. It is therefore conceived that selection of an application software for processing data as well as selection of a terminal equipment as a transmission destination of data is performed in the multifunctional peripheral equipment. In the case above, it is conceived that a terminal equipment and an application software making a pair are selected simultaneously as shown in FIG. 17.

In the configuration, the multifunctional peripheral equipment can be used in common with a plurality of terminal equipments connected to the multifunctional peripheral equipment through an LAN. Each terminal equipments, however, inevitably receives data unintended by a user because data can be sent from the multifunction peripheral equipment to each terminal equipment unconditionally. The problem above is undesirable from the point of view of security and the presence of terminal equipment users not wanting to receive data. It is therefore conceived that entry of a password assigned to each terminal equipments is required when data is sent from the multifunctional peripheral equipment to each terminal equipment. According to this measure, passwords can be managed to prevent each terminal equipments from receiving data unintended by the user. There is however a problem that operations such as management of passwords and entry of passwords are complicated.

Furthermore, when image data of the original read by the scanner function of the multifunctional peripheral equipment is to be sent to the terminal equipment, the user however needs to know the address of the transmission destination and enter the address manually on the user's own. Therefore there is a problem that the operation to send the image data to specific terminal equipment may be felt troublesome by the user.

In addition, as shown in FIG. 12, in the method in which the terminal equipment and the application software making a pair are selected at once, options corresponding to the number of terminal equipment-application software combinations, however, must be displayed. As a result, the number of options may be too large for the user to select an option.

SUMMARY OF THE INVENTION

The present invention has been made to solve the above problems, and therefore an object of the invention is to provide a data processing system, a data generator, a terminal equipment and a software program, in which a user's simple operation can be made to prevent the terminal equipment from receiving data without user's intention.

Another object of the invention is to provide an image data transmission/reception system, an image data generator, a terminal equipment and a program, in which a terminal equipment can be designated easily when image data generated by the image data generator is sent to the terminal equipment.

Furthermore, another object of the invention is to provide an image data processing system, an image data generator and a program, in which both selection of a terminal equipment to which image data generated by the image data generator will be sent and selection of an application software for processing the image data can be made easily.

In order to achieve the object, according to one aspect of the invention, there is provided an image data processing system including: an image data generating apparatus configured to generate image data; and a terminal equipment connected to the image data generating apparatus and configured to be installed with an application software, wherein the image data generating apparatus includes: an image data generating unit configured to generate the image data; a terminal equipment selection unit configured to select the terminal equipment as a transmission destination of the image data; an application software selection unit configured to select the application software for processing the image data; a notice sending unit configured to send a notice of the selected application software to the selected terminal equipment; and a data sending unit configured to send the image data to the selected terminal equipment, wherein the terminal equipment includes: a data receiving unit configured to receive the image data sent from the data sending unit; a processing unit configured to process the received image data by use of the application software designated by the notice sent from the notice sending unit.

BRIEF DESCRIPTION OF THE DRAWINGS

These and other objects and advantages of the present invention will become more fully apparent from the following detailed description taken with the accompanying drawings, in which:

FIGS. 3A and 3B are views showing examples of a registration information database stored in a scanner included in the data processing system;

DETAILED DESCRIPTION OF THE PREFERRED EMBODIMENTS

Referring now to the accompanying drawings, a description will be given in detail of preferred embodiments of the invention. Hereinafter, a data processing system according to an embodiment of the invention will be described with reference to the drawings.

Figure 1:
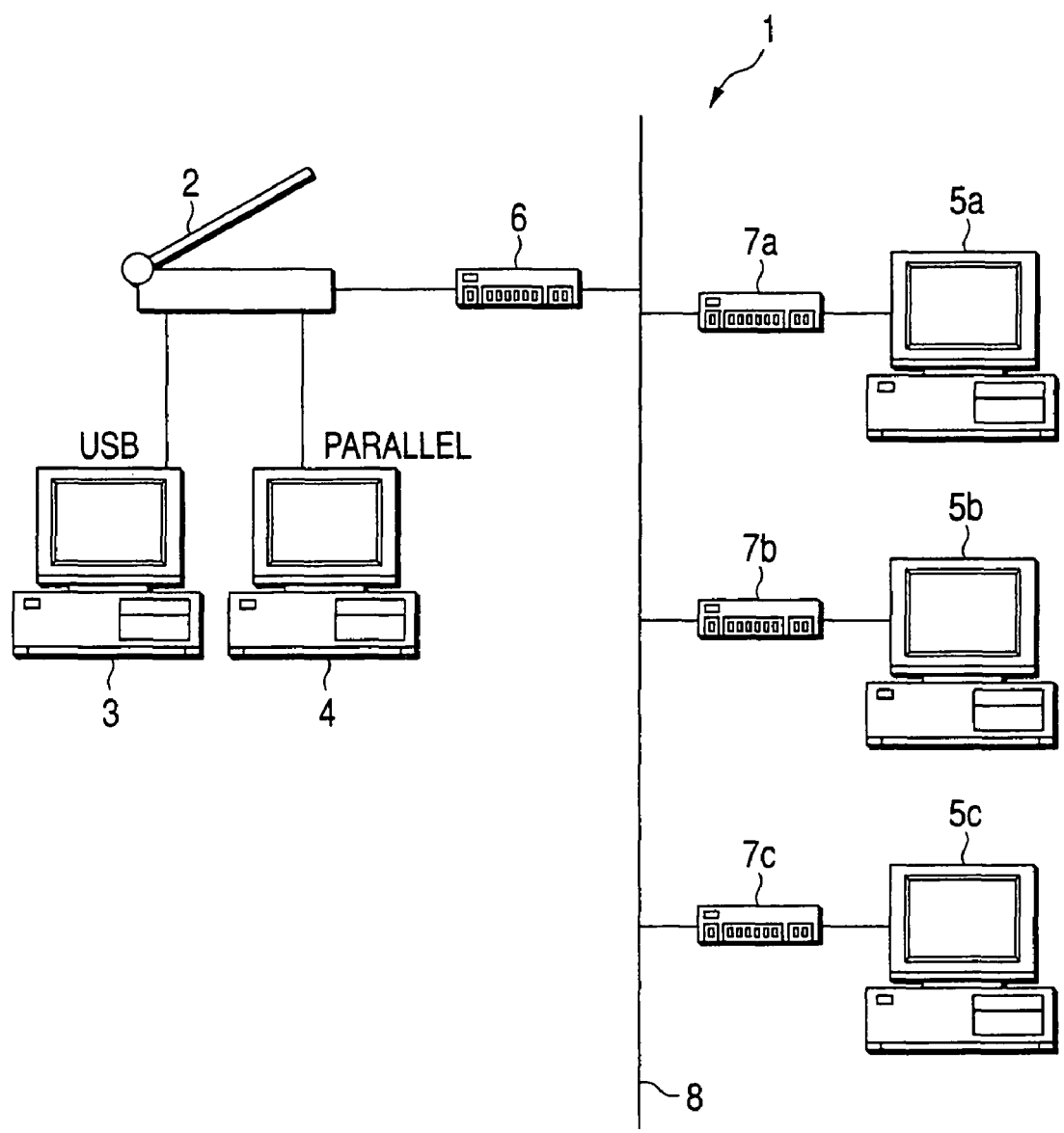
FIG. 1 is a diagram showing a system configuration of a data processing system according to an embodiment of the invention.
Figure 2A:
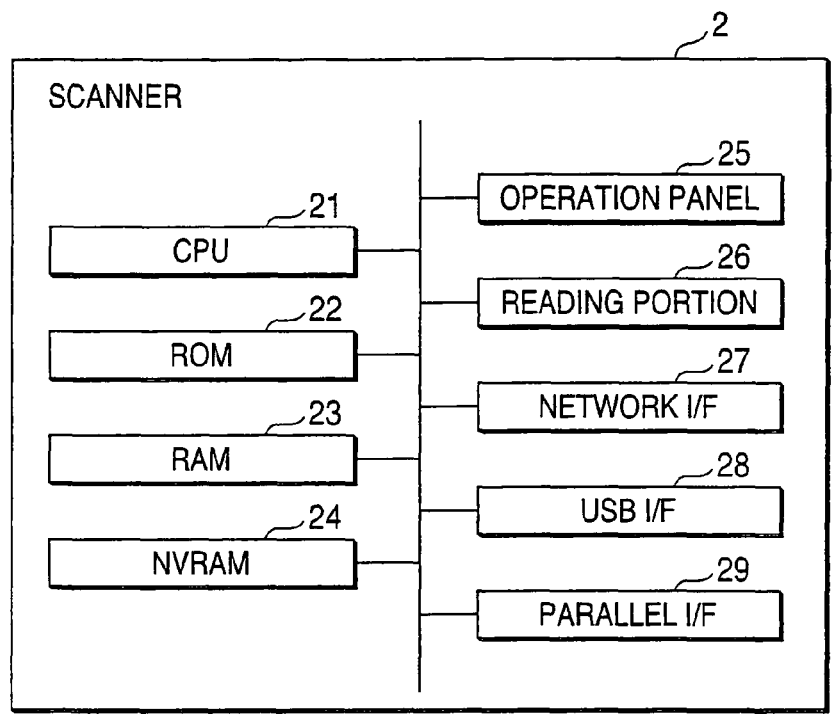
FIG. 2A is a diagram showing device configurations of devices as constituent members of the data processing system.
Figure 2B:
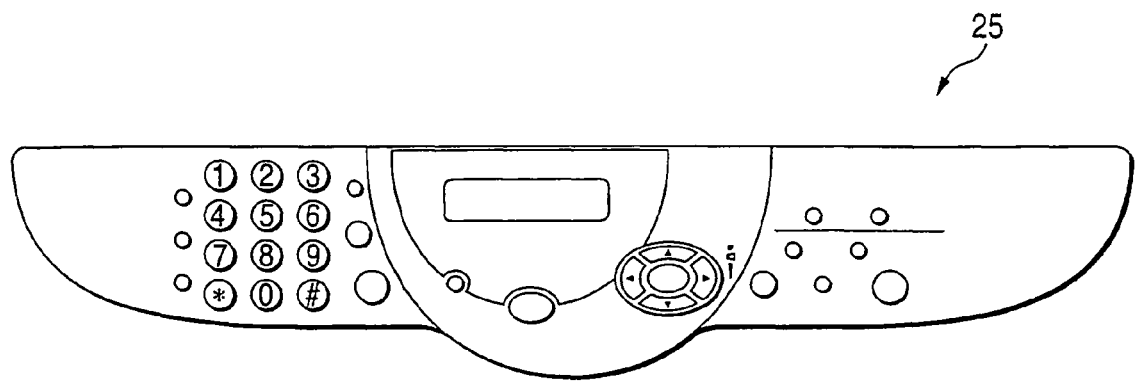
FIG. 2B is a schematic illustration showing an exemplary operation panel.
Figure 2C:
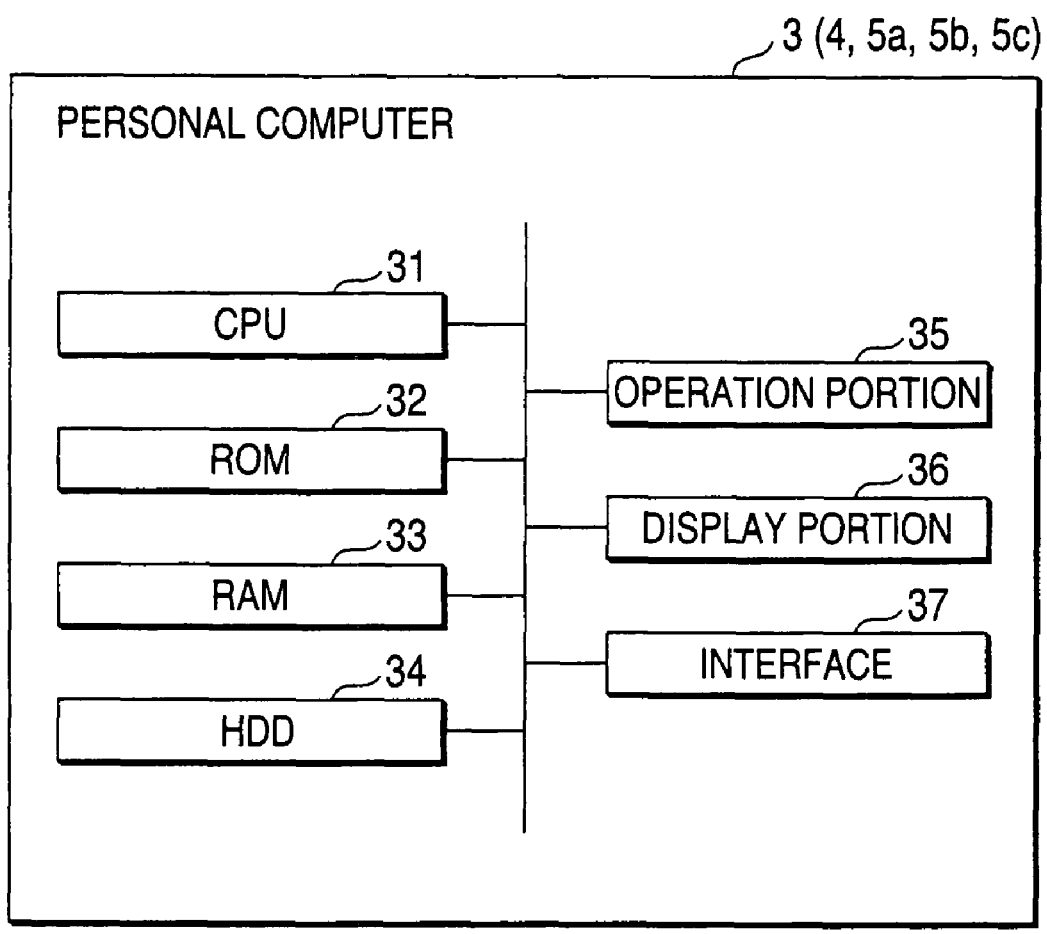
FIG. 2C is a diagram showing device configurations of devices as constituent members of the data processing system.

A system configuration of the data processing system according to the embodiment of the invention will be described first with reference to FIGS. 1, 2A, 2B and 2C. FIG. 1 is a diagram showing an example of the system configuration of the data processing system. FIGS. 2A, 2B and 2C are diagrams showing an example of the device configuration of devices as constituent members of the data processing system.

In the example shown in FIG. 1, the data processing system 1 includes a scanner 2, personal computers 3, 4, 5a, 5b and 5c, and hubs 6, 7a, 7b and 7c. The scanner 2 is connected to an LAN cable of a local area network (LAN) 8 through the hub 6. The personal computers 5a, 5b and 5c are connected to an LAN cable of the LAN 8 through the hubs 7a, 7b and 7c respectively. The personal computer 3 and the scanner 2 are connected to each other through a universal serial bus (USB) interface. The personal computer 4 and the scanner 2 are connected to each other through a parallel interface.

As shown in FIG. 2A, the scanner 2 in FIG. 1 includes a central processing unit (CPU) 21, a read-only memory (ROM) 22, a random access memory (RAM) 23, a non-volatile random access memory (NVRAM) 24, an operation panel 25, a reading portion 26, a network interface (network I/F) 27, a USB interface (USB I/F) 28, a parallel interface (parallel I/F) 29, and a hard disk device (HDD) 30. An example of the operation panel 25 is shown in FIG. 2B.

The CPU 21 functions as a central processing unit for performing various kinds of processing. In the embodiment, a registration information storing software program is stored in the ROM 22 in advance. The registration information storing software program causes the scanner 2 to execute a registration information storing process to store registration information, such as information (identification information) concerning personal computers connected to its own device and application softwares installed in the personal computers and registration verification information given to the scanner 2, in a registration information database (which will be described later) (see FIGS. 3A and 3B) of the RAM 23. When the scanner 2 is powered on, the CPU 21 reads the registration information storing software program from the ROM 22 and executes the registration information storing process (see FIG. 6) according to the registration information storing software program read from the ROM 22.

Further, a registration information deleting software program for causing the scanner 2 to read out information concerning the personal computer and application softwares installed in the personal computer from a the registration information database (see FIGS. 3A and 3B), to read out a registration information deleting software program for executing a registration information deleting process (see FIG. 7) to delete registration information from the ROM 22, and to execute the registration information deleting process.

Further, an image data processing software program for making the scanner 2 to execute image data processing to notify a personal computer selected by a user of an application software selected by the user, to read an image data from an original set in its own device and to send the image data read from the original to the personal computer selected by the user is stored in the ROM 22 in advance. The CPU 21 reads the image data processing software program from the ROM 22 according to a user's key operation (scanning operation) concerning reading of an image and executes the image data processing (see FIG. 8) according to the image data processing software program read from the ROM 22.

The ROM 22 is a read-only memory and forms part of a main storage device of the scanner 2. Various kinds of software programs such as a system software program, the registration information storing software program, the registration information deleting software program and the image data processing software program are stored in the ROM 22.

The RAM 23 is a read/write volatile memory and forms part of the main storage device of the scanner 2, like the ROM 22. The RAM 23 has a work area for storing intermediate results of data processing. The RAM 23 further has the registration information database in which registration information such as information concerning personal computers connected to the scanner 2, information concerning the application softwares installed in the personal computers, and encrypted registration verification information are stored as shown in FIGS. 3A and 3B. (The ROM 23 is equivalent to a terminal unit allocation unit and an application software allocation unit).

The NVRAM 24 is a read/write memory which is capable of storing data continuously even in the case where the memory is not supplied with electricity. An IP address set for the scanner 2 is stored in the NVRAM 24.

The registration information database will be described below with reference to FIGS. 3A and 3B. FIGS. 3A and 3B are views showing examples of the registration information database. In the example shown in each of FIGS. 3A and 3B, the registration information database includes "Transmission Destination" (identification information) indicating identification information concerning the names of personal computers connected to the scanner 2 or the names of interfaces by which the personal computers are connected, "Application" indicating application softwares installed in the personal computers, "IP Address" indicating IP addresses of the personal computers, "Port No." indicating port numbers concerning the personal computers, "Time-out Value" concerning information hold time, and "Registration Verification Information" indicating encrypted registration verification information given to the personal computers.

The operation panel 25 has a display device for outputting and displaying information on a display, and an input device for inputting data from the outside. For example, the operation panel 25 is made of a liquid-crystal display device or a plasma display device having a touch panel for forming an operation portion as an input device on a display surface. When a user makes a predetermined operation on the operation portion of the operation panel 25, a selection screen (including a terminal equipment selection group for selecting a terminal equipment as a transmission destination of image data, and an application software selection group for selecting an application software to process the image data) as shown in each of FIGS. 4A through 4D is displayed. The selection screen is used for selecting a terminal equipment as a transmission destination of image data and selecting an application software to process the image data. The operation portion of the operation panel 25 is used when the user enters input verification information (compared with registration verification information so that access to a personal computer selected by the user from the scanner 2 is permitted when the two pieces of information coincide with each other).

The selection screen will be described with reference to FIGS. 4A through 4D. FIGS. 4A through 4D are views showing examples of the selection screen.

Figure 4A:
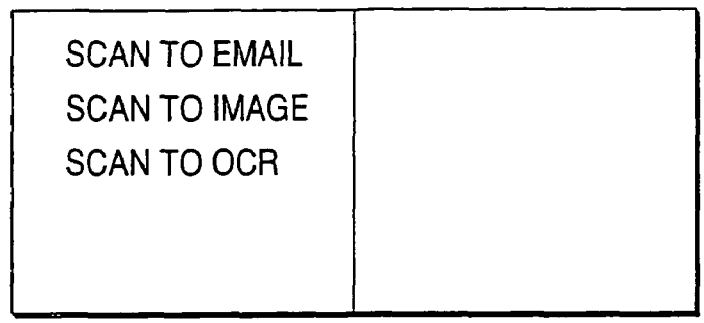
FIGS. 4A through 4D are views showing examples of a selection screen displayed on the scanner included in the data processing system.
Figure 4B:
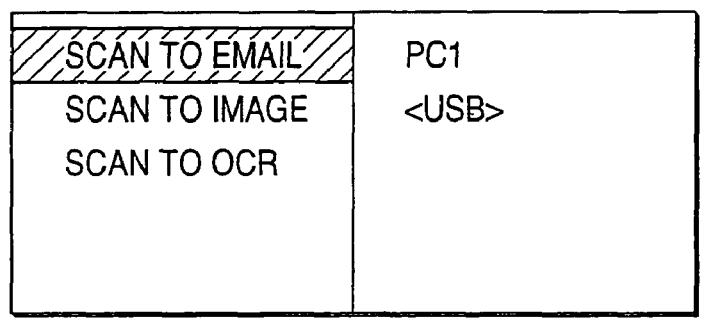

In the example shown in each of FIGS. 4A and 4B, an application software selection group for selecting an application software to process image data is displayed in the left of the selection screen while a terminal equipment selection group for selecting a terminal equipment as a transmission destination of the image data is displayed in the right of the selection screen. An application software is first selected from the application software selection group. FIGS. 4A and 4B show an example of the selection screen in the case where the number of application softwares (e.g., three in total, "Scan to Email", "Scan to Image" and "Scan to OCR") is smaller than the number of transmission destinations (e.g., five in total, "PC1", "PC2", "PC3", "USB" and "Parallel") as represented by the registration information database shown in FIG. 3A.

The application software selection group is displayed on the basis of the names of application softwares stored in the registration information database. The terminal selection group is display on the basis of the names of transmission destinations stored in the registration information database. When an application software is selected from the application software selection group, only terminal equipments concerning the selected application software and registered in the registration information database are displayed as the terminal equipment selection group (see FIGS. 3A, 4A and 4B). Incidentally, the terminal equipment selection group is displayed on the basis of the names of personal computers with respect to personal computers network-connected to the scanner 2 and the names of interfaces for connecting the scanner 2 to personal computers with respect to computers local-connected to the scanner 2. As shown in FIGS. 4A through 4D, the names of interfaces in the terminal equipment selection group are enclosed in "< >" for definitely discriminating between the names of personal computers and the names of interfaces.

Figure 4C:
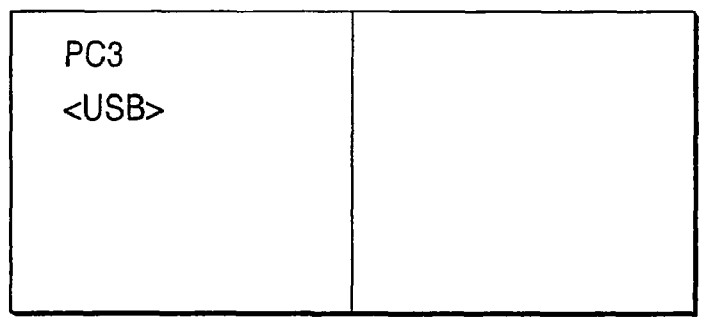
Figure 4D:
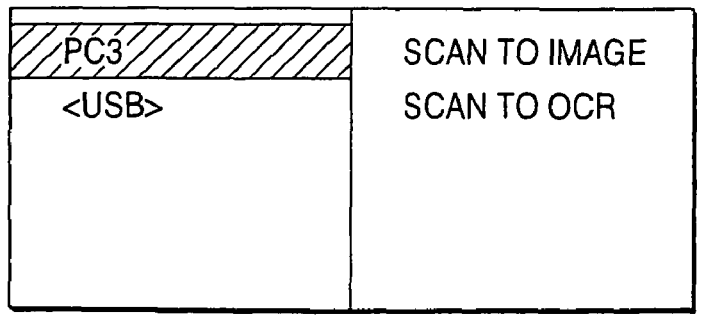

In the example shown in each of FIGS. 4C and 4D, the terminal equipment selection group is displayed in the left of the selection screen while the application software selection group is displayed in the right of the selection screen. A terminal equipment is first selected from the terminal equipment selection group. FIGS. 4C and 4D show an example of the selection screen in the case where the number of transmission destinations (e.g., two in total, "PC3" and "USB") is smaller than the number of application softwares (e.g., three in total, "Scan to Email", "Scan to Image" and "Scan to OCR") as represented by the registration information database shown in FIG. 3B.

When a terminal equipment is selected from the terminal equipment selection group, only application softwares concerning the selected terminal equipment and registered in the registration information database are displayed as the application software selection group (see FIGS. 3B, 4C and 4D). Incidentally, except the conditions described above, the terminal equipment selection group and the application software selection group in each of FIGS. 4C and 4D are substantially the same as those in each of FIGS. 4A and 4B. As a method for displaying the selection screen, the terminal equipment selection group and the application software selection group may be displayed simultaneously as shown in FIGS. 4A through 4D or may be displayed individually.

The reading portion 26 provides a scanner function for reading an original set in the scanner 2 and generating image data of the read original. (The reading portion 26 is equivalent to a data generating unit.)

The network interface 27 connects the scanner 2 to the LAN 8 through the hub 6 so that the scanner 2 can communicate with respective devices such as the personal computers 5a, 5b and 5c connected to the LAN 8. The USB interface 28 connects the scanner 2 to the personal computer 3 so that the scanner 2 can communicate with the personal computer 3. The parallel interface 29 connects the scanner 2 to the personal computer 4 so that the scanner 2 can communicate with the personal computer 4.

The HDD 30 is a storage unit including a read/write storage device (i.e., a hard disk drive). Image data generated by the scanner function of the reading portion 26 is temporarily stored in the HDD 30.

As shown in FIG. 2C, each of the personal computers 3, 4, 5a, 5b and 5c in FIG. 1 includes a CPU 31, an ROM 32, an RAM 33, an HDD 34, an operation portion 35, a display portion 36, and an interface 37.

The CPU 31 functions as a central processing unit for performing various kinds of processing. In the embodiment, a registration information sending software program for making each of the personal computers execute a registration information sending process to send registration information, such as information concerning the name of the personal computer, the name decided by the user, IP address of the personal computer, port number of a port of an interface to be used, time-out value and application software installed in the personal computer, and registration verification information (encrypted on the basis of an encryption process) given to the personal computer, to the scanner 2 is stored in the HDD 34 in advance. When the personal computer is powered on, the CPU 31 reads the registration information sending software program from the HDD 34 and executes the registration information sending process (see FIG. 5) according to the registration information sending software program read from the HDD 34.

Further, an image data processing software program for making each of the personal computers execute image data processing to process image data received from the scanner 2 by an application software designated by the scanner 2 is stored in the HDD 34 in advance. The CPU 31 reads the image data processing software program from the HDD 34 and executes image data processing (see FIG. 9) according to the image data processing software program read from the HDD 34.

The ROM 32 is a read-only memory and forms part of a main storage device of the personal computer. Various kinds of software programs such as a system software program are stored in the ROM 32.

The RAM 33 is a read/write volatile memory and forms part of the main storage device of the personal computer, like the ROM 32. The RAM 33 has a work area for storing intermediate results of data processing.

The HDD 34 is a reader including a read/write storage device (i.e., a hard disk). The registration information sending software program, the image data processing software program, the various kinds of application softwares, as well as the name and IP address of its own device (personal computer) and registration verification information, are stored in the HDD 34.

The operation portion 35 forms an input device of the personal computer. The operation portion 35 includes a keyboard having a predetermined number of entry keys, and a pointing device such as a mouse. The display portion 36 is a display device for outputting and displaying information on a display. For example, the display portion 36 is made of a liquid-crystal display device or a plasma display device. Incidentally, the liquid-crystal display device may be of a passive matrix type such as an STN type or a DSTN type or may be of an active matrix type such as a TFT type.

In the personal computer 3, the interface 37 is connected to the USB interface 28 of the scanner 2 so that the personal computer 3 can communicate with the scanner 2. In the personal computer 4, the interface 37 is connected to the parallel interface 29 of the scanner 2 so that the personal computer 4 can communicate with the scanner 2. In the personal computer 5a, 5b or 5c, the interface 37 is connected to the LAN 8 through the hub 7a, 7b or 7c so that the personal computer 5a, 5b or 5c can communicate with respective devices such as the scanner 2 connected to the LAN 8.

Figure 5:
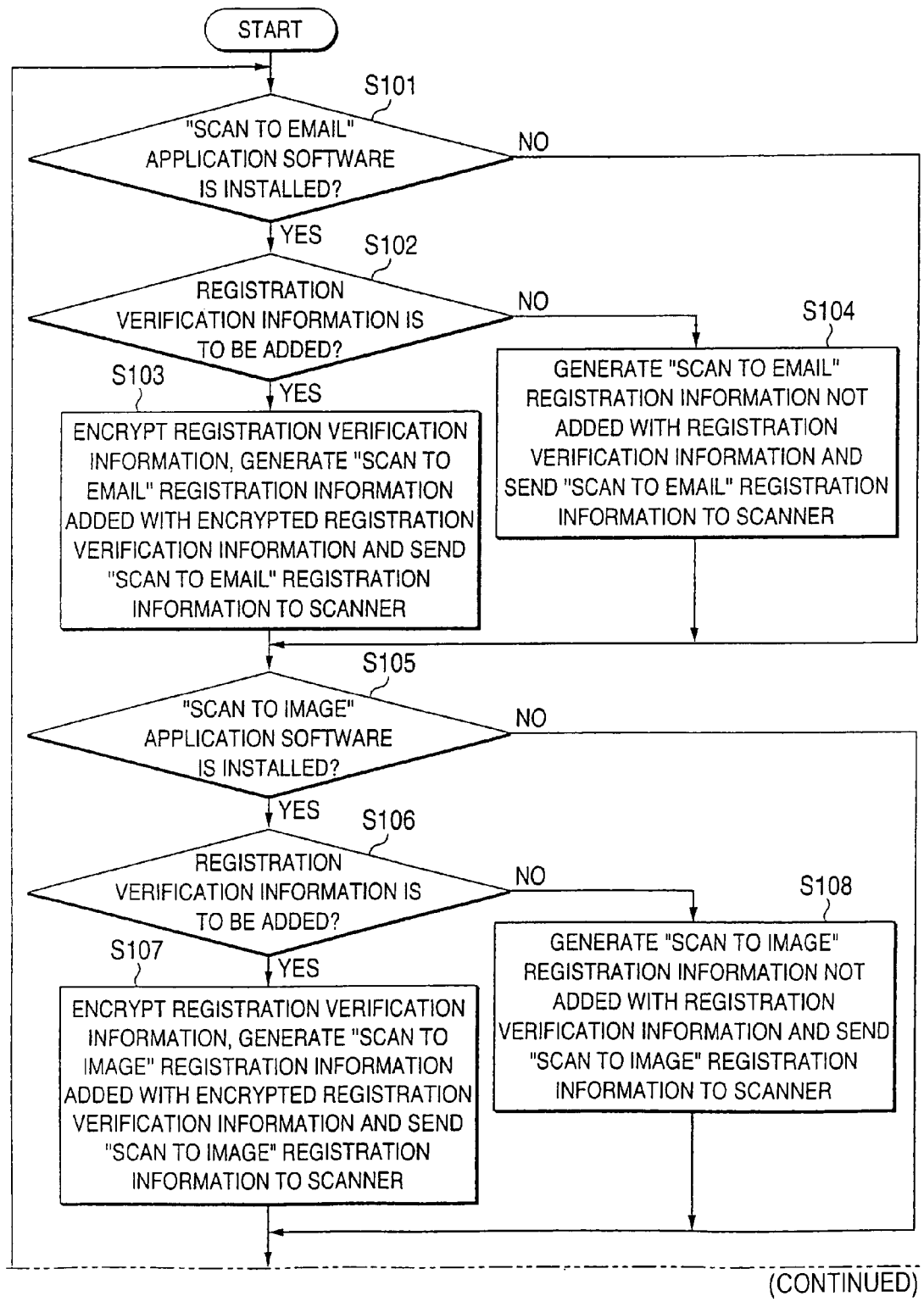
FIG. 5 is a flow chart showing an operation flow of a registration information sending process executed by a personal computer included in the data processing system.

The registration information sending process executed in the data processing system 1 will be described below with reference to FIG. 5. FIG. 5 is a flow chart showing an operation flow of the registration information sending process executed by each of the personal computers 3, 4, 5a, 5b and 5c as constituent members of the data processing system 1. When the personal computer 3, 4, 5a, 5b or 5c is powered on, the CPU 31 of the personal computer reads the registration information sending software program from the HDD 34 and starts the execution of the registration information sending process shown in FIG. 5.

In step S101 (hereinafter referred to simply as "S101"; this rule applies to other steps), the CPU 31 determines whether an application software (hereinafter referred to as "Scan to Email" application software) for sending an e-mail with image data to its own device (personal computer) is installed in the HDD 34 or not. When the CPU 31 makes a decision that the "Scan to Email" application software is installed (S101: YES), the process proceeds to S102. On the other hand, when the CPU 31 makes a decision that the "Scan to Email" application software is not installed (S101: NO), the process proceeds to S105.

When the CPU 31 makes a decision that the "Scan to Email" application software is installed (S101: YES), the CPU 31 makes a determination in S102 as to whether registration verification information is to be added to registration information sent to the scanner 2 or not. When the CPU 31 makes a decision that registration verification information is to be added (S102: YES), the process proceeds to S103. On the other hand, when the CPU 31 makes a decision that registration verification information is not to be added (S102: NO), the process proceeds to S104. For example, the determination as to whether registration verification information is to be added or not, is made on the basis of the user's designation in advance as to whether registration verification information is to be added or not.

When the CPU 31 makes a decision that registration verification information is to be added (S102: YES), the CPU 31 in S103 encrypts registration verification information and generates "Scan to Email" registration information including the encrypted registration verification information (<IP address of its own device>:<port number>:<name of its own device (transmission destination stored in the registration information database)>:<information indicating "Scan to Email" application software>:<time-out value>:<encrypted registration verification information>). Incidentally, in each of the personal computer 3 connected through the USB interface and the personal computer 4 connected through the parallel interface, registration information including neither <IP address of its own device> nor <port number> is generated. The personal computer is controlled by the CPU 31 so that the generated registration information is stored in a packet, and sent to the scanner 2. Then, the process proceeds to S105.

When the CPU 31 makes a decision that registration verification information is not to be added (S102: NO), the CPU 31 in S104 generates "Scan to Email" registration information (<IP address of its own device>:<port number>:<name of its own device>:<information indicating "Scan to Email" application software>:<time-out value>). Incidentally, in each of the personal computer 3 connected through the USB interface and the personal computer 4 connected through the parallel interface, registration information including neither <IP address of its own device> nor <port number> is generated. The personal computer is controlled by the CPU 31 so that the generated registration information is stored in a packet and sent to the scanner 2. Then, the process proceeds to S105.

In S105, the CPU 31 determines whether an application software (hereinafter referred to as "Scan to Image" application software) for editing image data is installed in its own device or not. When the CPU 31 makes a decision that the "Scan to Image" application software is installed in the HDD 34 (S105: YES), the process proceeds to S106. On the other hand, when the CPU 31 makes a decision that the "Scan to Image" application software is not installed in the HDD 34 (S105: NO), the process proceeds to S109.

When the CPU 31 makes a decision that the "Scan to Image" application software is installed in the HDD 34 (S105: YES), the CPU 31 makes a determination in S106 as to whether registration verification information is to be added to registration information sent to the scanner 2 or not. When the CPU 31 makes a decision that registration verification information is to be added (S106: YES), the process proceeds to S107. On the other hand, when the CPU 31 makes a decision that registration verification information is not to be added (S106: NO), the process proceeds to S108.

When the CPU 31 makes a decision that registration verification information is to be added (S106: YES), the CPU 31 in S107 encrypts registration verification information and generates "Scan to Image" registration information including the encrypted registration verification information (<IP address of its own device>:<port number>:<name of its own device>:<information indicating "Scan to Image" application software>:<time-out value>:<encrypted registration verification information>). Incidentally, in each of the personal computer 3 connected through the USB interface and the personal computer 4 connected through the parallel interface, registration information including neither <IP address of its own device> nor <port number> is generated. The personal computer is controlled by the CPU 31 so that the generated registration information is stored in a packet and sent to the scanner 2. Then, the process proceeds to S109.

When the CPU 31 makes a decision that registration verification information is not to be added (S106: NO), the CPU 31 in S108 generates "Scan to Image" registration information (<IP address of its own device>:<port number>:<name of its own device>:<information indicating "Scan to Image" application software>:<time-out value>). Incidentally, in each of the personal computer 3 connected through the USB interface and the personal computer 4 connected through the parallel interface, registration information including neither <IP address of its own device> nor <port number> is generated. The personal computer is controlled by the CPU 31 so that the generated registration information is stored in a packet and sent to the scanner 2. Then, the process proceeds to S109.

In S109, the CPU 31 determines whether an application software (hereinafter referred to as "Scan to OCR" application software) for recognizing characters by analyzing image data by its own device is installed in the HDD 34 or not. When the CPU 31 makes a decision that the "Scan to OCR" application software is installed in the HDD 34 (S109: YES), the process proceeds to S110. On the other hand, when the CPU 31 makes a decision that the "Scan to OCR" application software is not installed in the HDD 34 (S109: NO), the process proceeds to S113.

When the CPU 31 makes a decision that the "Scan to OCR" application software is installed in the HDD 34 (S109: YES), the CPU 31 makes a determination in S110 as to whether registration verification information is to be added to registration information sent to the scanner 2 or not. When the CPU 31 makes a decision that registration verification information is to be added (S110: YES), the process proceeds to S111. On the other hand, when the CPU 31 makes a decision that registration verification information is not to be added (S110: NO), the process proceeds to S112.

When the CPU 31 makes a decision that registration verification information is to be added (S110: YES), the CPU 31 in S111 encrypts registration verification information and generates "Scan to OCR" registration information added with the encrypted registration verification information (<IP address of its own device>:<port number>:<name of its own device>:<information indicating "Scan to OCR" application software>:<time-out value>:<encrypted registration verification information>). Incidentally, in each of the personal computer 3 connected through the USB interface and the personal computer 4 connected through the parallel interface, registration information including neither <IP address of its own device> nor <port number> is generated. The personal computer is controlled by the CPU 31 so that the generated registration information is stored in a packet and sent to the scanner 2. Then, the process proceeds to S113.

When the CPU 31 makes a decision that registration verification information is not to be added (S110: NO), the CPU 31 in S112 generates "Scan to OCR" registration information (<IP address of its own device>:<port number>:<name of its own device>:<information indicating "Scan to OCR" application software>:<time-out value>). Incidentally, in each of the personal computer 3 connected through the USB interface and the personal computer 4 connected through the parallel interface, registration information including neither <IP address of its own device> nor <port number> is generated. The personal computer is controlled by the CPU 31 so that the generated registration information is stored in a packet and sent to the scanner 2. Then, the process proceeds to S113.

In S113, the CPU 31 determines whether a predetermined time has passed or not. When the CPU 31 makes a decision that the predetermined time has not passed (S113: NO), the CPU 31 repeats S113 to monitor whether the predetermined time has passed. On the other hand, when the CPU 31 makes a decision that the predetermined time has passed (S113: YES), the process returns to S101 so that the CPU 31 repeats the procedure of from S101 to S113. Incidentally, in each of S103, S104, S107, S108, S111 and S112, registration information may be sent to a directory server allowed to be accessed by the scanner 2, instead of being sent to the scanner 2.

Figure 6:
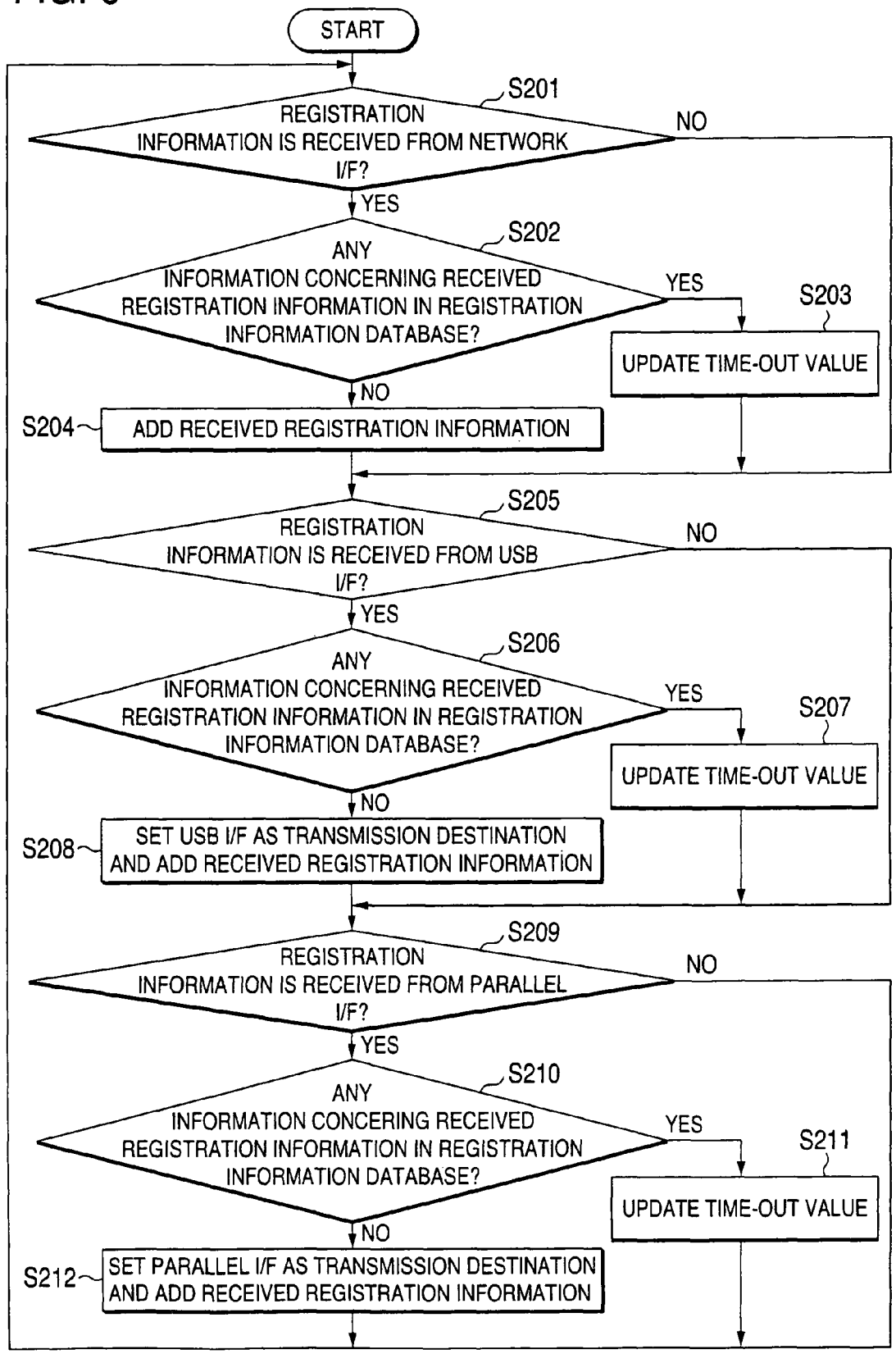
FIG. 6 is a flow chart showing an operation flow of a registration information storing process executed by the scanner included in the data processing system.

Next, the registration information storing process executed in the data processing system 1 will be described with reference to FIG. 6. FIG. 6 is a flow chart showing an operation flow of the registration information storing process executed by the scanner 2 as a constituent member of the data processing system 1. When the scanner 2 is powered on, the CPU 21 of the scanner 2 reads the registration information storing software program from the ROM 22 to start the execution of the registration information storing process shown in FIG. 6.

In S201, the CPU 21 of the scanner 2 determines whether a packet containing registration information (at least one of "Scan to Email" registration information, "Scan to Image" registration information and "Scan to OCR" registration information) is received through the network interface 27 or not. When the CPU 21 makes a decision that the packet is received through the network interface 27 (S201: YES), the process proceeds to S202. On the other hand, when the CPU 21 makes a decision that the packet is not received through the network interface 27 (S201: NO), the process proceeds to S205.

When the CPU 21 makes a decision that the packet is received through the network interface 27 (S201: YES), the CPU 21 makes a determination in S202 as to whether information (the name of the transmission destination, information of the application software, IP address, port number, and encrypted registration verification information: encrypted registration verification information may be absent) concerning registration information stored in the received packet has been already stored in the registration information database of the RAM 23 (shown in FIG. 3A or 3B) or not. When the CPU 21 makes a decision that information concerning registration information stored in the received packet has been already stored in the registration information database (S202: YES), the process proceeds to S203. On the other hand, when the CPU 21 makes a decision that information concerning registration information stored in the received packet has been not stored in the registration information database (S202: NO), the process proceeds to S204.

When the CPU 21 makes a decision that information concerning registration information stored in the received packet has been already stored in the registration information database (S202: YES), the CPU 21 in S203 updates the time-out value of information concerning the received registration information and stored in the registration information database to the time-out value contained in the received registration information. Then, the process proceeds to S205.

When the CPU 21 makes a decision that information concerning registration information stored in the received packet has been not stored in the registration information database (S202: NO), the CPU 21 in S204 extracts registration information (the name of the transmission destination, information of the application software, IP address, port number, time-out value, and encrypted registration verification information: encrypted registration verification information may be absent) from the received packet and adds the extracted registration information to the registration information database. As a result, the registration information is registered in the registration information database while the IP address of the personal computer in which the packet was sent from (i.e., identification information of the personal computer used when image data is sent from the scanner 2 to the personal computer) is associated with the encrypted registration verification information given to the personal computer. Then, the process proceeds to S205.

In S205, the CPU 21 determines whether a packet containing registration information is received through the USB interface 28 or not. When the CPU 21 makes a decision that the packet is received through the USB interface 28 (S205: YES), the process proceeds to S206. On the other hand, when the CPU 21 makes a decision that the packet is not received through the USB interface 28 (S205: NO), the process proceeds to S209.

When the CPU 21 makes a decision that the packet is received through the USB interface 28 (S205: YES), the CPU 21 makes a determination in S206 as to whether information (the name of the transmission destination, information of the application software, IP address, port number, and encrypted registration verification information: encrypted registration verification information may be absent) concerning registration information stored in the received packet has been already stored in the registration information database of the RAM 23 (shown in FIG. 3A or 3B) or not. When the CPU 21 makes a decision that information concerning registration information stored in the received packet has been already stored in the registration information database (S206: YES), the process proceeds to S207. On the other hand, when the CPU 21 makes a decision that information concerning registration information stored in the received packet has been not stored in the registration information database (S206: NO), the process proceeds to S208.

When the CPU 21 makes a decision that information concerning registration information stored in the received packet has been already stored in the registration information database (S206: YES), the CPU 21 in S207 updates the time-out value of information concerning the received registration information and stored in the registration information database to the time-out value contained in the received registration information. Then, the process proceeds to S209.

When the CPU 21 makes a decision that information concerning registration information stored in the received packet has been not stored in the registration information database (S206: NO), the CPU 21 in S208 extracts registration information (the name of the transmission destination, the name of the application software, IP address, port number, time-out value, and encrypted registration verification information: encrypted registration verification information may be absent) from the received packet. The CPU 21 sets the USB interface as the transmission destination and adds the name of the application software, IP address, port number, time-out value and encrypted registration verification information (if necessary) contained in the extracted registration information to the registration information database. As a result, the registration information is registered in the registration information database while the IP address of the personal computer as the packet sender is associated with the encrypted registration verification information given to the personal computer. Then, the process proceeds to S209. Incidentally, because the USB interface is set as the transmission destination in the registration information database, the personal computer name contained in the registration information is not registered in the registration information database.

In S209, the CPU 21 determines whether a packet containing registration information is received through the parallel interface 29 or not. When the CPU 21 makes a decision that the packet is received through the parallel interface 29 (S209: YES), the process proceeds to S210. On the other hand, when the CPU 21 makes a decision that the packet is not received through the parallel interface 29 (S209: NO), the process returns to S201.

When the CPU 21 makes a decision that the packet is received through the parallel interface 29 (S209: YES), the CPU 21 makes a determination in S210 as to whether information (the name of the transmission destination, information of the application software, IP address, port number, and encrypted registration verification information: encrypted registration verification information may be absent) concerning registration information stored in the received packet has been already stored in the registration information database of the RAM 23 (shown in FIG. 3A or 3B) or not. When the CPU 21 makes a decision that information concerning registration information stored in the received packet has been already stored in the registration information database (S210: YES), the process proceeds to S211. On the other hand, when the CPU 21 makes a decision that information concerning registration information stored in the received packet has been not stored in the registration information database (S210: NO), the process proceeds to S212.

When the CPU 21 makes a decision that information concerning registration information stored in the received packet has been already stored in the registration information database (S210: YES), the CPU 21 in S211 updates the time-out value of information concerning the received registration information and stored in the registration information database to the time-out value contained in the received registration information. Then, the process returns to S201.

When the CPU 21 makes a decision that information concerning registration information stored in the received packet has been not stored in the registration information database (S210: NO), the CPU 21 in S212 extracts registration information (the name of the transmission destination, the name of the application software, IP address, port number, time-out value, and encrypted registration verification information: encrypted registration verification information may be absent) from the received packet. The CPU 21 sets the parallel interface as the transmission destination and adds the name of the application software, IP address, port number, time-out value and encrypted registration verification information (if necessary) contained in the extracted registration information to the registration information database. As a result, the registration information is registered in the registration information database while the IP address of the personal computer as the packet sender is associated with the encrypted registration verification information given to the personal computer. Then, the process returns to S201. Incidentally, because the parallel interface is set as the transmission destination in the registration information database, the personal computer name contained in the registration information is not registered in the registration information database.

Figure 7:
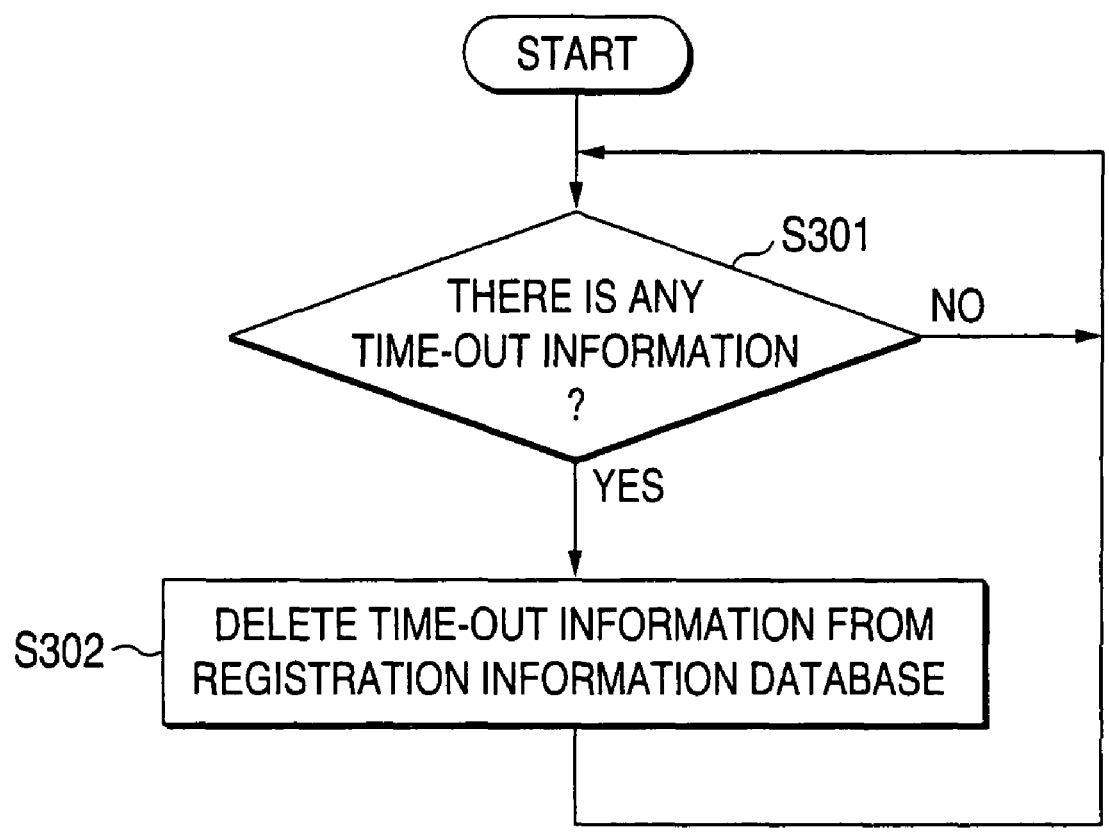
FIG. 7 is a flow chart showing an operation flow of a registration information deleting process executed by the scanner included in the data processing system.

Next, the registration information deleting process executed in the data processing system 1 will be described with reference to FIG. 7. FIG. 7 is a flow chart showing an operation flow of the registration information deleting process executed by the scanner 2 as a constituent member of the data processing system 1. When the scanner 2 is powered on, the CPU 21 of the scanner 2 reads the registration information deleting software program from the ROM 22 to start the execution of the registration information deleting process shown in FIG. 7.

In S301, the CPU 21 of the scanner 2 determines whether time-out registration information (i.e., registration information in which the time-out value has reached zero) is present in the registration information database (shown in FIG. 3A or 3B) or not. When the CPU 21 makes a decision that time-out registration information is present (S301: YES), the process proceeds to S302. On the other hand, when the CPU 21 makes a decision that time-out registration information is not present (S301: NO), the CPU 21 repeats S301.

In S302, the CPU 21 deletes the time-out registration information from the registration information database. Then, the process returns to S301.

Figure 8:
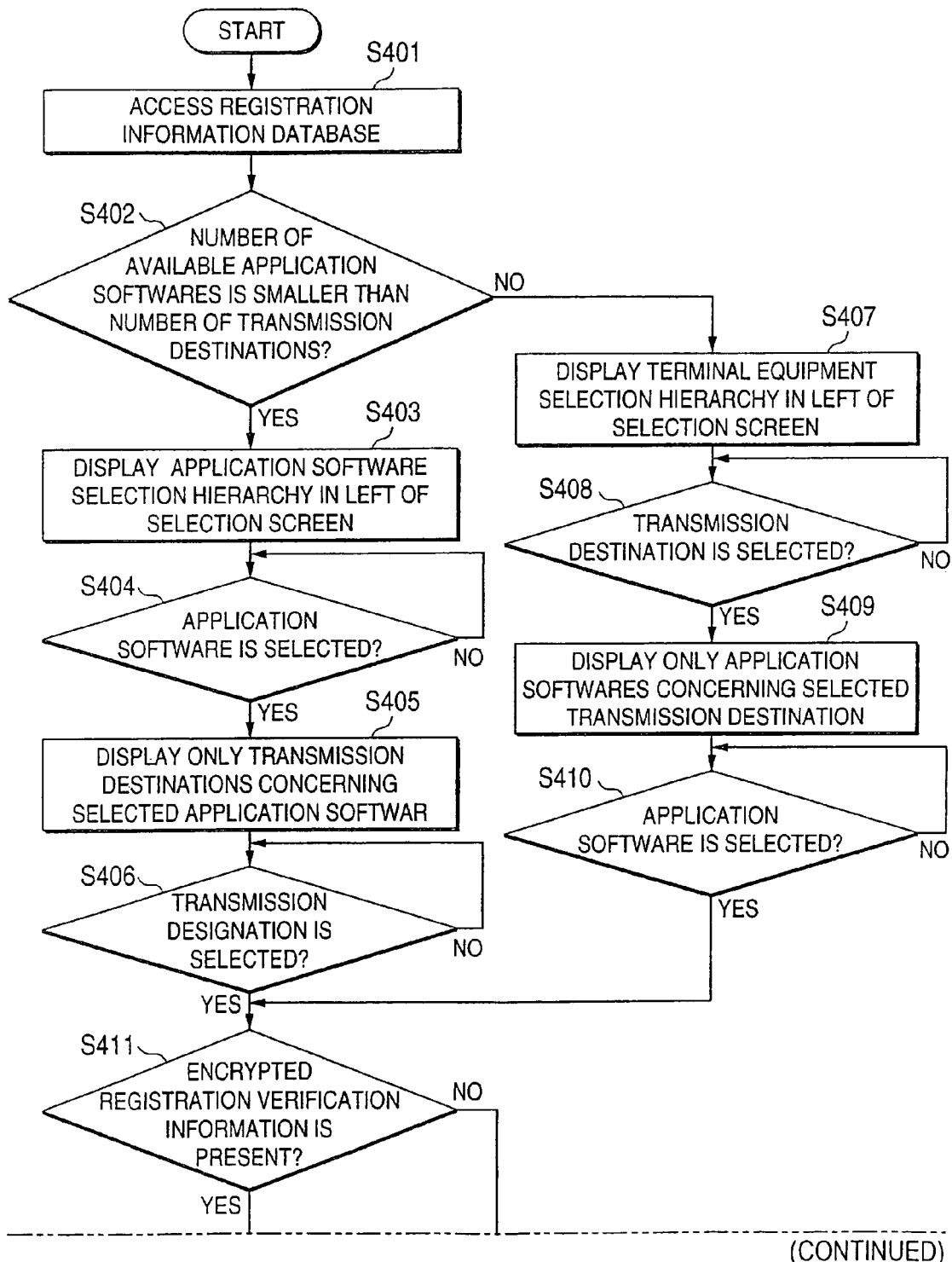
FIG. 8 is a flow chart showing an operation flow of image data processing executed by the scanner included in the data processing system.

Next, the image data processing executed in the data processing system 1 will be described with reference to FIG. 8. FIG. 8 is a flow chart showing an operation flow of the image data processing executed by the scanner 2 as a constituent member of the data processing system 1. When a user operates the operation panel 25 of the scanner 2 to make a predetermined key operation, the CPU 21 of the scanner 2 reads the image data processing software program from the ROM 22 to start the execution of the image data processing shown in FIG. 8.

In S401, the CPU 21 of the scanner 2 accesses the registration information database stored in the RAM 23. Then, the process proceeds to S402. Incidentally, in S401, the CPU 21 may access registration information registered in a directory server, instead of accessing the registration information database stored in the RAM 23.

In S402, the CPU 21 determines whether the number of application softwares is smaller than the number of transmission designations in the registration information database or not. When the CPU 21 makes a decision that the number of application softwares is smaller than the number of transmission destinations (S402: YES), the process proceeds to S403. On the other hand, when the CPU 21 makes a decision that the number of application softwares is not smaller than the number of transmission destinations (S402: NO), the process proceeds to S407.

For example, in the case of the registration information database shown in FIG. 3A, the process proceeds to S403 because the number of application softwares (e.g., three in total, "Scan to Email", "San to Image" and "Scan to OCR") is smaller than the number of transmission destinations (e.g., five in total, "PC1", "PC2", "PC3", "USB" and "Parallel") (S402: YES). For example, in the case of the registration information database shown in FIG. 3B, the process proceeds to S407 because the number of application softwares (e.g., three in total, "Scan to Email", "Scan to Image" and "Scan to OCR") is not smaller than the number of transmission destinations (e.g., two in total, "PC3" and "USB") (S402: NO).

When the CPU 21 makes a decision that the number of application softwares is smaller than the number of transmission destinations (S402: YES), the CPU 21 in S403 displays a selection screen having the application software selection group disposed in the left of the selection screen and the terminal equipment selection group (in which no information concerning terminal equipments is displayed in this stage) disposed in the right of the selection screen as shown in FIG. 4A. Only application softwares present in the registration information database are displayed in the application software selection group. Incidentally, the selection screen in this stage is controlled by the CPU 21 so that an application software can be selected from the application software selection group disposed in the left of the selection screen. Then, the process proceeds to S404.

In S404, the CPU 21 determines whether an application software is selected by the user from the application software selection group in the selection screen displayed in the step S403 or not. When the CPU 21 makes a decision that an application software is not selected (S404: NO), the CPU 21 repeats S404 to monitor an application software selected by the user. On the other hand, when the CPU 21 makes a decision that an application software is selected (S404: YES), the process proceeds to S405.

In S405, the CPU 21 displays only transmission destinations concerning the application software selected by the user in the terminal equipment selection group in the selection screen on the basis of the registration information database shown in FIG. 3A or 3B. Then, the process proceeds to S406. When, for example, "Scan to Email" is selected from the application software selection group in the selection screen shown in FIG. 4A on the assumption that the registration information database is shown in FIG. 3A, "PC1" and "<USB>" are displayed as transmission destinations in the terminal equipment selection group in the selection screen as shown in FIG. 4B.

In S406, the CPU 21 determines whether a transmission destination is selected by the user from the terminal equipment selection group in the selection screen displayed in the step S405 or not. When the CPU 21 makes a decision that a transmission destination is not selected (S406: NO), the CPU 21 repeats S406 to monitor a transmission destination selected by the user. On the other hand, when the CPU 21 makes a decision that a transmission destination is selected (S406: YES), the process proceeds to S411.

When the CPU 21 makes a decision that the number of application softwares is not smaller than the number of transmission destinations (S402: NO), the CPU 21 in S407 displays a selection screen having the terminal equipment selection group disposed in the left of the selection screen and the application software selection group (in which no information concerning application softwares is displayed in this stage) disposed in the right of the selection screen as shown in FIG. 4C. Only transmission destinations present in the registration information database are displayed in the terminal equipment selection group. Incidentally, the selection screen in this stage is controlled by the CPU 21 so that a transmission destination can be selected from the terminal equipment selection group disposed in the left of the selection screen. Then, the process proceeds to S408.

In S408, the CPU 21 determines whether a transmission destination is selected by the user from the terminal equipment selection group in the selection screen displayed in the step S407 or not. When the CPU 21 makes a decision that a transmission destination is not selected (S408: NO), the CPU 21 repeats S408 to monitor a transmission destination selected by the user. On the other hand, when the CPU 21 makes a decision that a transmission destination is selected (S408: YES), the process proceeds to S409.

When the CPU 21 makes a decision that a transmission destination is selected (S408: YES), the CPU 21 in S409 displays only application softwares concerning the transmission destination selected by the user in the application software selection group in the selection screen on the basis of the registration information database shown in FIG. 3A or 3B. Then, the process proceeds to S410.

When, for example, "PC3" is selected from the terminal equipment selection group in the selection screen shown in FIG. 4C on the assumption that the registration information database is shown in FIG. 3B, "Scan to Image" and "Scan to OCR" are displayed as application softwares in the application software selection group in the selection screen as shown in FIG. 4D.

In S410, the CPU 21 determines whether an application software is selected by the user from the application software selection group in the selection screen display in the step S409 or not. When the CPU 21 makes a decision that an application software is not selected (S410: NO), the CPU 21 repeats S410 to monitor an application software selected by the user. On the other hand, when the CPU 21 makes a decision that an application software is selected (S410: YES), the process proceeds to S411. Incidentally, the CPU 21 executing the procedure of from S401 to S410 is equivalent to a terminal decision unit and an application software decision unit.

In S411, the CPU 21 determines whether encrypted registration verification information corresponding to the transmission destination selected by the user is present in the registration information database (shown in FIG. 3A or 3B) or not. When the CPU 21 makes a decision that encrypted registration verification information is present in the registration information database (S411: YES), the process proceeds to S412. On the other hand, when the CPU 21 makes a decision that encrypted registration verification information is not present in the registration information database (S411: NO), the process proceeds to S415.

When the CPU 21 makes a decision that encrypted registration verification information is present in the registration information database (S411: YES), the CPU 21 in S412 controls the scanner 2 to request input verification information entered by the user and makes a determination as to whether the user enters input verification information or not using the operation portion of the operation panel 25. When the CPU 21 makes a decision that the user does not enter input verification information (S412: NO), the CPU 21 repeats S412 to monitor input verification information entered by the user. On the other hand, when the CPU 21 makes a decision that the user enters input verification information (S412: YES), the process proceeds to S413.

When the CPU 21 makes a decision that the user enters input verification information (S412: YES), the CPU 21 in S413 encrypts the entered input verification information on the basis of an encryption process substantially equal to the encryption process used for encrypting the registration verification information. Then, the process proceeds to S414.

In S414, the CPU 21 determines whether the input verification information encrypted in the step S413 and the encrypted registration verification information corresponding to the selected transmission destination and stored in the registration information database are coincident with each other or not. When the CPU 21 makes a decision that the two are coincident with each other (S414: YES), the process proceeds to S415. On the other hand, when the CPU 21 makes a decision that the two are not coincident with each other (S414: NO), the image data processing is terminated. That is, sending of image data to the selected transmission destination is rejected.

In S415, the CPU 21 sends a notice of registration information of the application software selected from the application software selection group by the user to the personal computer as the transmission destination selected from the terminal equipment selection group by the user on the basis of the IP address of the personal computer stored in the registration information database or on the basis of the USB or parallel interface through which the personal computer is connected. Then, the process proceeds to S416. Incidentally, the CPU 21 executing the procedure of S415 is equivalent to a notice sending unit and a request sending unit.

In S416, the CPU 21 controls the reading portion 26 to read an original set in the scanner 2 and store the generated image data based on the reading in the HDD 30. Then, the process proceeds to S417.

In S417, the CPU 21 determines whether or not a notice is received from the personal computer as the transmission destination selected from the terminal equipment selection group by the user. When the CPU 21 makes a decision that the notice is not received (S417: NO), the CPU 21 repeats S417 to monitor the notice received from the personal computer as the selected transmission destination. When the CPU 21 makes a decision that the notice is received (S417: YES), the process proceeds to S418.

In S418, the CPU 21 determines whether the notice received from the personal computer as the selected transmission destination in S417 is a data sending request or not. When the CPU 21 makes a decision that the notice from the personal computer as the selected transmission destination is not a data sending request (S418: NO), the process proceeds to S420. On the other hand, when the CPU 21 makes a decision that the notice from the personal computer as the selected transmission destination is a data sending request (S418: YES), the process proceeds to S419.

In S419, the CPU 21 reads the image data stored in the HDD 30 in S416 and sends the image data to the personal computer as the transmission destination selected from the terminal equipment selection group by the user on the basis of the IP address of the personal computer stored in the registration information database or on the basis of the USB or parallel interface through which the personal computer is connected. Then, the process proceeds to S420. Incidentally, the CPU 21 executing the procedure of S419 is equivalent to a data sending unit.

In S420, the CPU 21 deletes the image data stored in the HDD 30 in S416 from the HDD 30. Thus, the image data processing is terminated.

Figure 9:
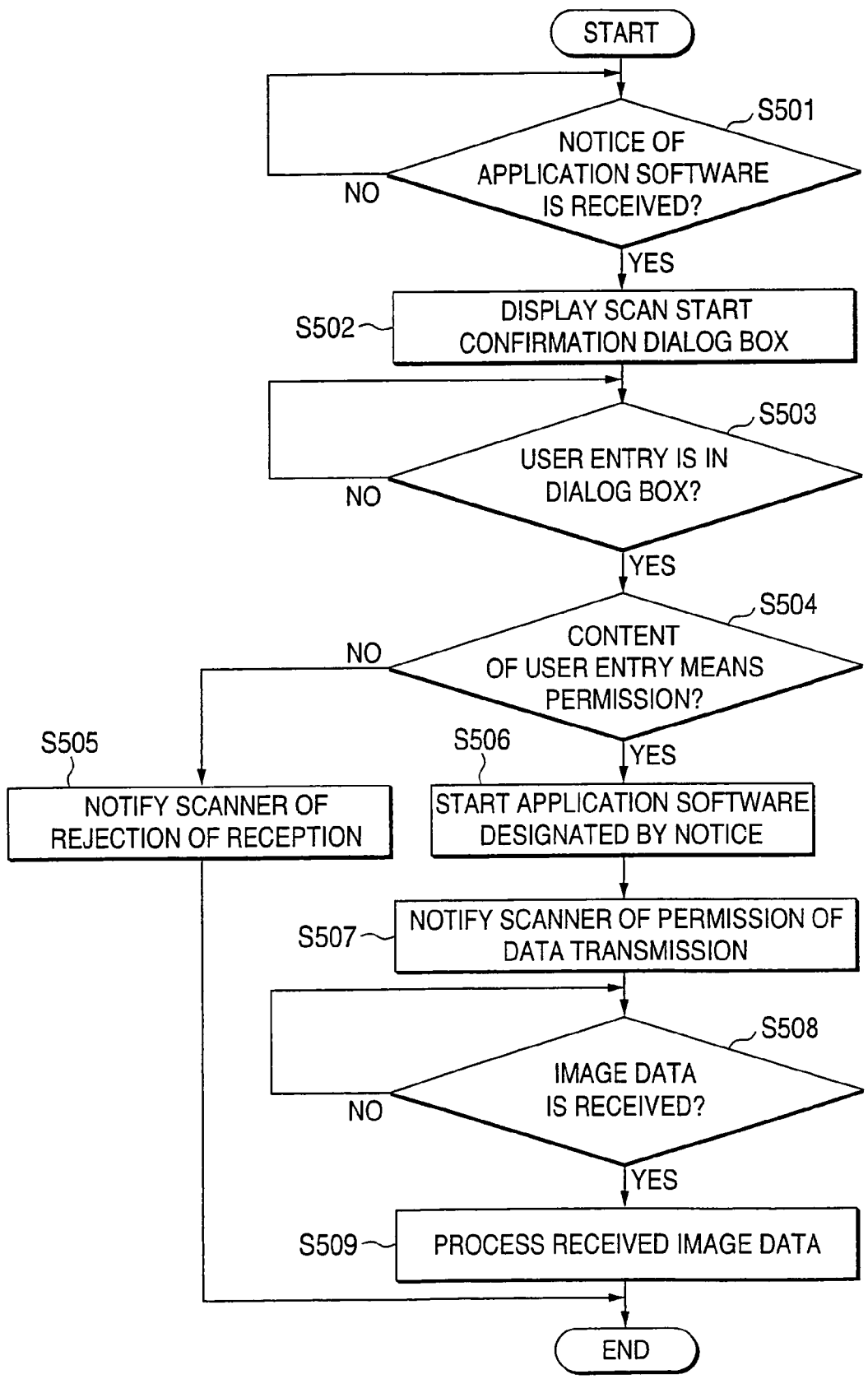
FIG. 9 is a flow chart showing an operation flow of image data processing executed by a personal computer included in the data processing system.

Next, the image data processing executed in the data processing system 1 will be described with reference to FIG. 9. FIG. 9 is a flow chart showing an operation flow of the image data processing executed by each of the personal computers 3, 4, 5a, 5b and 5c as constituent members of the data processing system 1. When each of the personal computers 3, 4, 5a, 5b and 5c is powered on, the CPU 31 of the personal computer reads the image data processing software program from the HDD 34 to start the execution of the image data processing shown in FIG. 9.

In S501, the CPU 31 determines whether a notice of registration information of an application software to be operated is received from the scanner 2 or not. When the CPU 31 makes a decision that the notice of registration information of an application software to be operated is not received from the scanner 2 (S501: NO), the CPU 31 repeats S501 to monitor reception of the notice of registration information of an application software. On the other hand, when the CPU 31 makes a decision that the notice of registration information of an application software to be operated is received from the scanner 2 (S501: YES), the process proceeds to S502. Incidentally, the CPU 31 executing the procedure of S501 is equivalent to a notice receiving unit and a request receiving unit.

In S502, the CPU 31 displays a check dialog box as a pop-up window for checking start of scanning made by the scanner 2. The check dialog box contains a button for selecting whether starting of scanning is permitted or not, an entry frame for entering a point of time when image data generated by the scanning of the scanner 2 will be received, and a decision button for deciding contents entered in the check dialog box. Incidentally, the scanner 2 starts scanning before starting of scanning is permitted, that is, the scanner 2 waits for permission of starting of scanning while image data is generated and stored in the HDD 30 (see S415 and S416 in FIG. 8). This is a technique for shortening the time required for receiving the image data. After the check dialog box is displayed, the process proceeds to S503.

In S503, the CPU 31 determines whether entry based on user's operation is made in the check dialog box displayed in S502 or not. The determination as to whether entry based on user's operation is made in the check dialog box or not, is made on the basis of whether the decision button of the check dialog box is pushed down by the user or not. When the CPU 31 makes a decision that entry based on user's operation is not made in the check dialog box (S503: NO), the CPU 31 repeats S503 to monitor entry based on user's operation in the check dialog box. On the other hand, when the CPU 31 makes a decision that entry based on user's operation is made in the check dialog box (S503: YES), the process proceeds to S504. Incidentally, the CPU 31 executing the procedure of S502 and S503 is equivalent to a decision unit.

In S504, the CPU 31 determines whether permission of starting of scanning of the scanner 2 is entered in the check dialog box on the basis of user's operation or not. When the CPU 31 makes a decision that permission of starting of scanning of the scanner 2 is not entered in the check dialog box on the basis of user's operation (S504: NO), the process proceeds to S505. In S505, the CPU 31 sends a notice of rejection of sending of data to the scanner 2. After the notice of rejection of sending of data is sent to the scanner 2, the image data processing is terminated. Incidentally, the CPU 31 executing the procedure of S505 is equivalent to a permission notice sending unit.

On the other hand, when the CPU 31 makes a decision that permission of starting of scanning of the scanner 2 is entered in the check dialog box on the basis of user's operation (S504: YES), the process proceeds to S506.

In S506, the CPU 31 operates the application software to be operated which software is designated by the notice received from the scanner 2 in S501. After the operation of the application software to be operated is completed, the process proceeds to S507.

In S507, the CPU 31 sends a notice of permission of sending of data to the scanner 2. Then, the process proceeds to S508. Incidentally, the CPU 31 executing the procedure of S507 is equivalent to a permission notice sending unit.

In S508, the CPU 31 determines whether image data is received from the scanner 2 or not. When the CPU 31 makes a decision that image data is not received (S508: NO), the CPU 31 repeats S508 to monitor reception of image data. On the other hand, when the CPU 31 makes a decision that image data is received (S508: YES), the process proceeds to S509. Incidentally, the CPU 31 executing the procedure of S508 is equivalent to a data receiving unit.

In S509, the CPU 31 processes the image data received from the scanner 2 on the basis of the application software operated in S506. After processing based on the application software operated is completed, the image data processing is terminated. Incidentally, the CPU 31 executing the procedure of S509 is equivalent to a processing unit.

Figure 10:
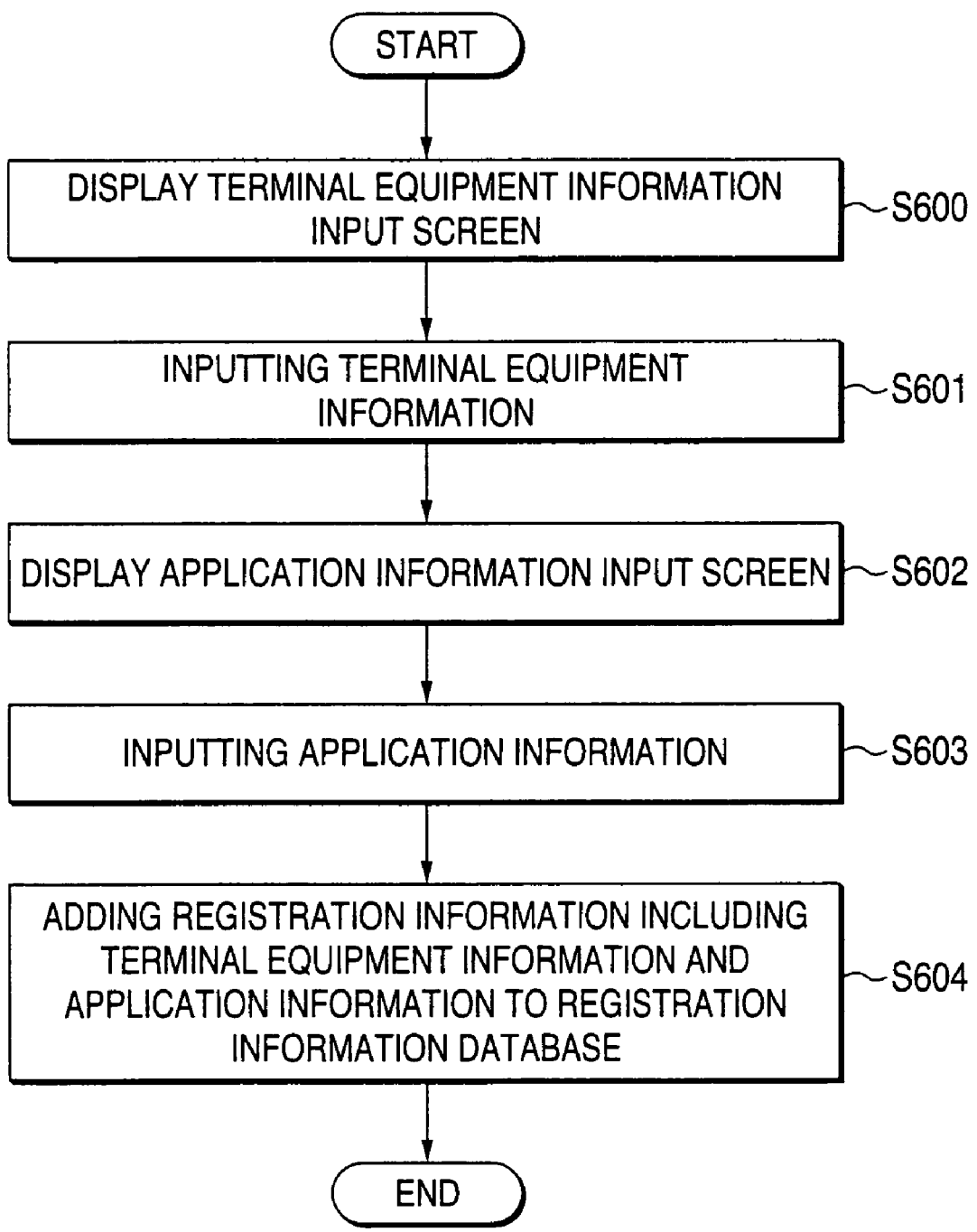
FIG. 10 is a flow chart showing an operation flow of inputting a registration information.

Hereinafter, a process to input the registration information in the scanner 2 will be described with reference to FIG. 10.

When the registration information is to be input by the user, the CPU 21 of the scanner 2 controls the operation panel 25 to display a terminal information input screen (S600).

When the CPU 21 determines that a terminal information such as IP address and port number of the personal computer, is input by the user (S601), the CPU 21 controls the operation panel 25 to display an application information input screen (S602).

When the CPU 21 determines that an application information concerning the application softwares installed in the computers, is input by the user (S603), the CPU 21 executes a registration information storing process to store registration information including the terminal information and the application information into the RAM 21 by executing the registration information storing software program.

As described above, the registration information is input by the user in the scanner 2.

Figure 11:
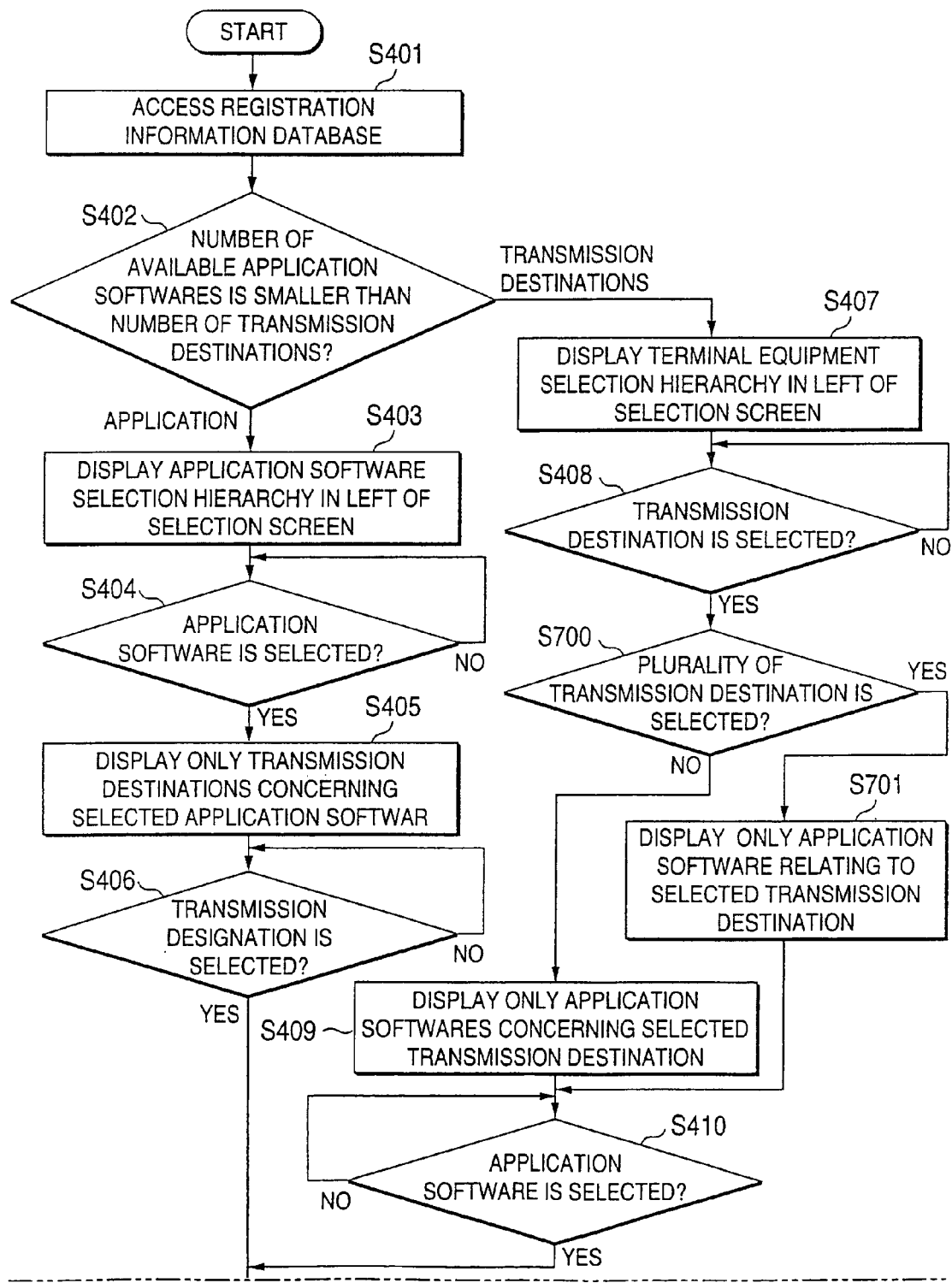
FIG. 11 is a flow chart showing another operation flow of image data processing executed by the scanner included in the data processing system.
Figure 12:
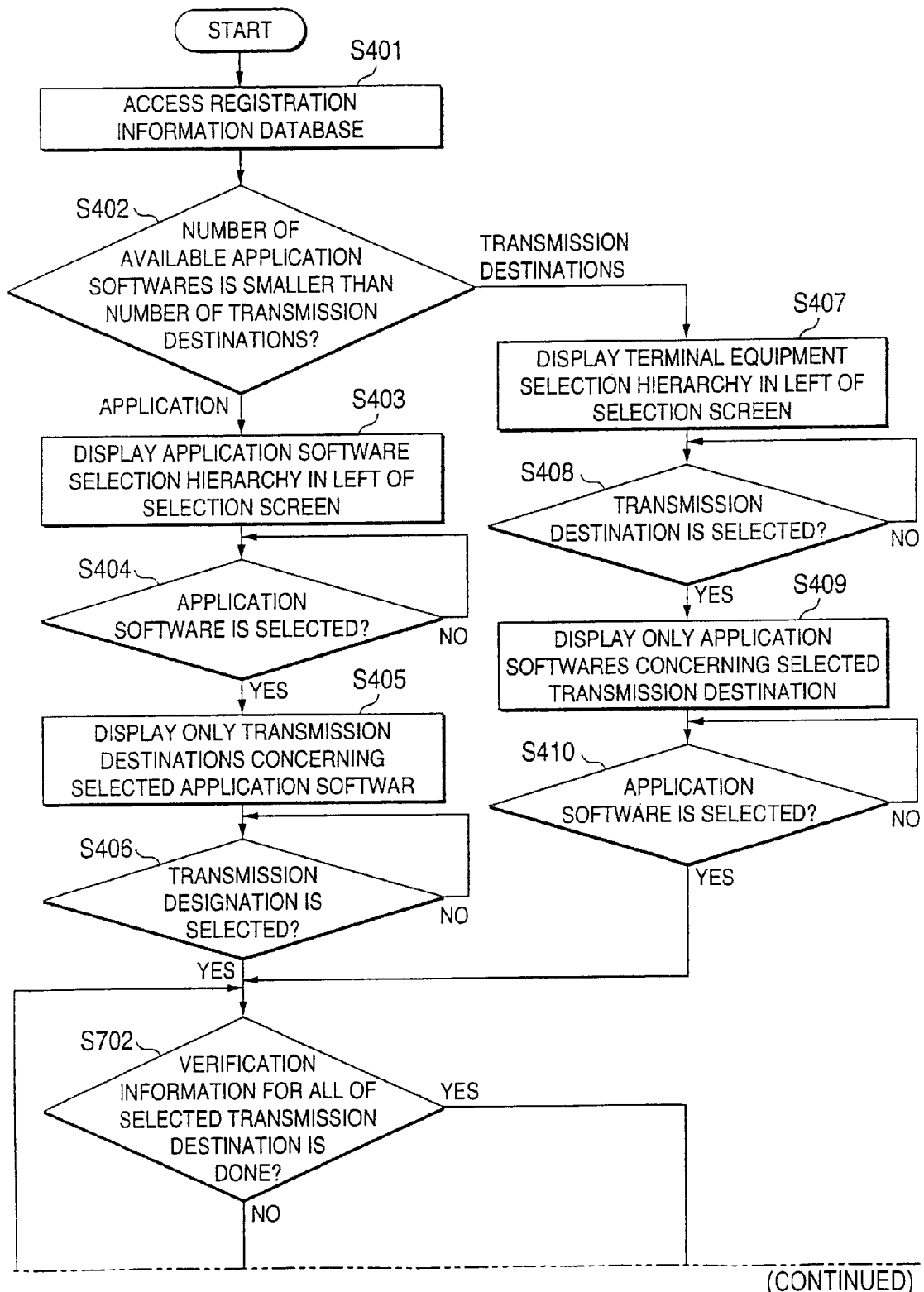
FIG. 12 is a flow chart showing another operation flow of image data processing executed by the scanner included in the data processing system.
Figure 13:
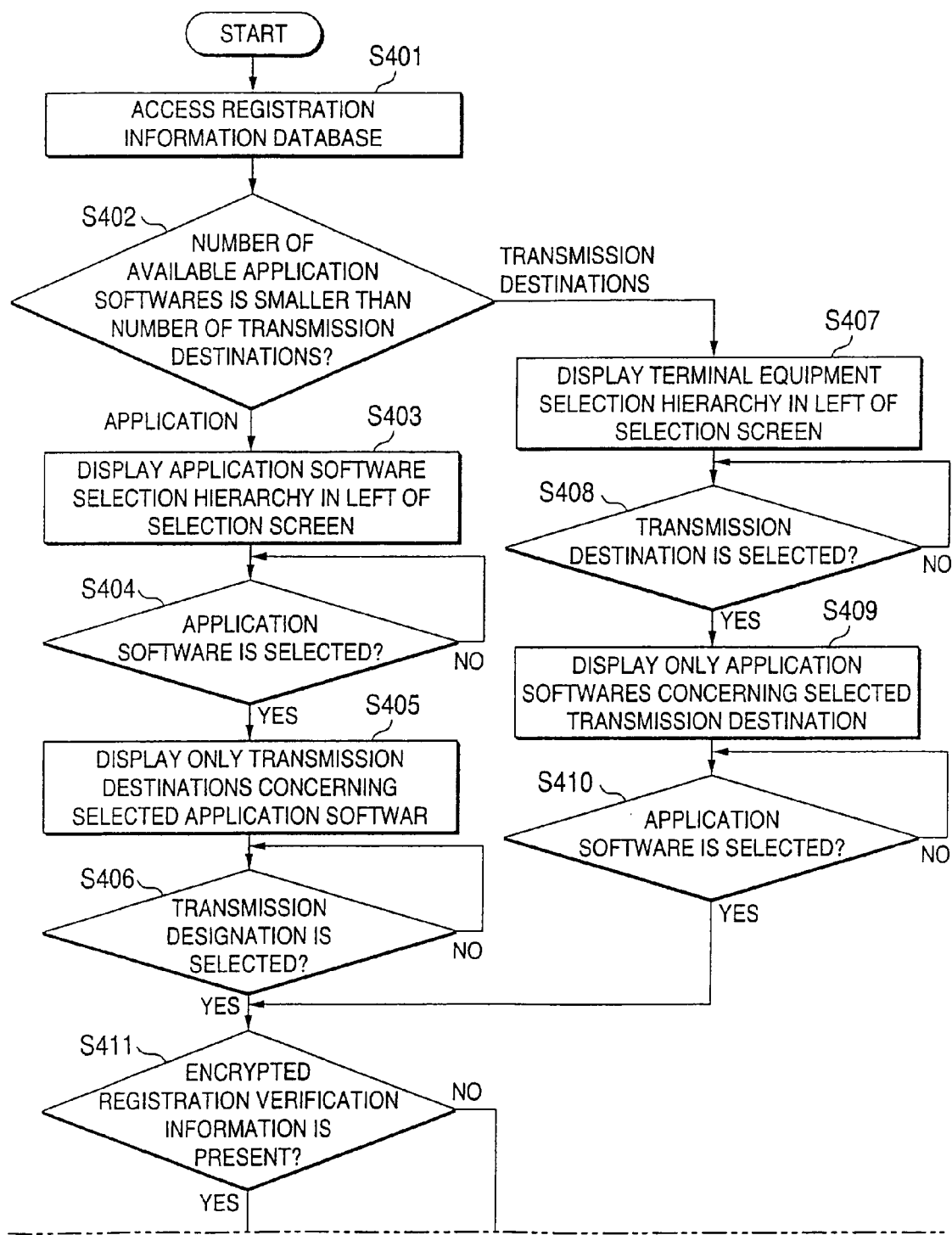
FIG. 13 is a flow chart showing another operation flow of image data processing executed by the scanner included in the data processing system.

Hereinafter, another embodiment of the invention to send the image data to a plurality of personal computers will be described with reference to FIGS. 11, 12 and 13. FIGS. 11, 12 and 13 are flow charts showing an exemplary process executed by the CPU 21 of the scanner 2. Incidentally, the process to send the image data to a plurality of personal computers is different with the process described above with reference to FIG. 8 in minor points in which described hereinbelow. Therefore, the same steps of process as those shown in FIG. 8 are denoted by the same reference numerals as those in FIG. 8, and the detailed description of the corresponding steps will be omitted hereinbelow.

As shown in FIG. 11, in a case where the scanner 2 is configured to send the image data to a plurality of personal computers, the CPU 21, when the transmission destination is selected in S408, determines whether a plurality of the transmission destination are selected or not (S700). When the CPU 21 makes a decision that a single transmission destination is selected, the process proceeds to S410. When the CPU 21 makes a decision that a plurality of transmission destination is selected, the CPU 21 displays all of the application softwares concerning the transmission destination selected by the user in the application software selection group in the selection screen (S701), and the process proceeds to S410.

As shown in FIG. 12, the CPU 21, when the transmission destination is selected in S406 or the application software is selected in S410, proceeds the process to S702.

In S702, the CPU 21 determines whether or not the process of S411 through S414 has been done for each of the selected transmission destination. When the CPU 21 makes a decision that the process of S411 through S414 has been done for all of the selected transmission destination, the CPU 21 proceeds the process to S415. When the CPU 21 makes a decision that the process of S411 through S414 has not been done for all of the selected transmission destination, the CPU 21 proceeds the process to S703.

In S703, the CPU 21 picks up one of the transmission destination among the selected destination and proceeds the process of S411 through S414 for each of the transmission destination picked up.

When the CPU 21 makes a decision that the two verification information are coincident with each other (S414: YES), the CPU 21 proceeds the process to S702. When the CPU 21 makes a decision that the two verification information are not coincident with each other (S414: NO), the CPU 21 proceeds the process to S704.

In S704, the CPU 21 cancels the transmission destination picked up in S702 from the selection made by the user, and proceeds the process to S702.

In S415, the CPU 21 sends the notice of registration information of the application software selected from the application software selection group by the user to each of the personal computer as the transmission destination selected from the terminal equipment selection group by the user. Then, the process proceeds to S416.

Further, as shown in FIG. 13, the CPU 21, proceeds the process to S705 after the process of S419.

In S705, the CPU 21 determines whether or not the response is received from all of the selected transmission destination. When the CPU 21 makes a decision that the response is received from all of the selected transmission destination, the CPU 21 proceeds the process to S420. When the CPU 21 makes a decision that the response is not received from all of the selected transmission destination, the CPU 21 proceeds the process to S417.

As described above, the scanner 2 may be configured to send the image data to a plurality of personal computers (transmission destination) that has been selected by the user. In the embodiment, there may be configured that, when the user selects a specific transmission destination in which a password is required in sending the image data, the selection of the specific transmission destination is rejected.

Figure 14:
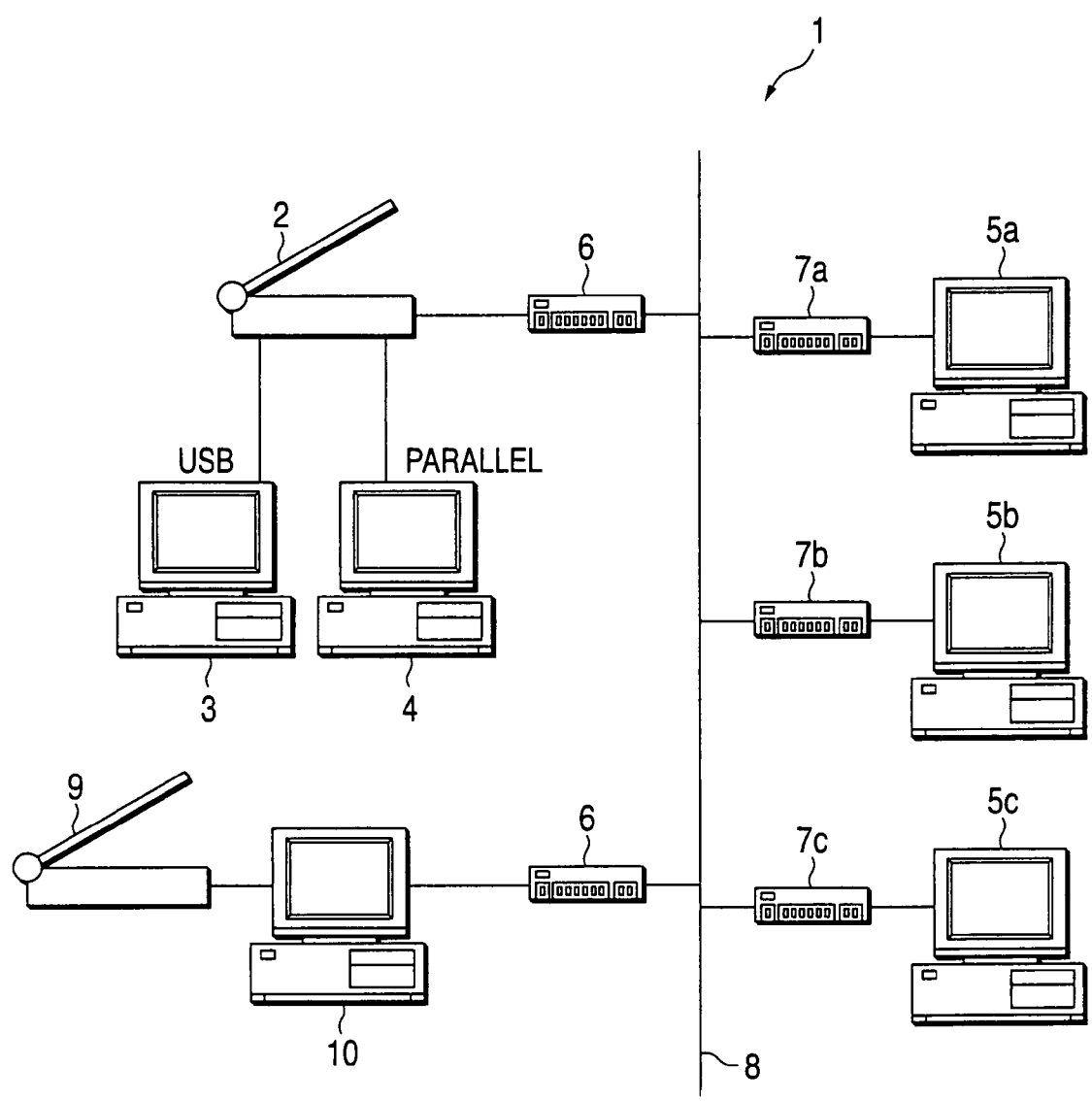
FIG. 14 is a diagram showing a system configuration of a data processing system according to another embodiment of the invention.

In the embodiment described above, the scanner 2 is configured to send the scanned image data to the personal computers selected as the transmission destination. However, as shown in FIG. 14, the feature of the scanner 2 described above may be provided by a combination of a scanner 9 having conventional scanning feature and a scanner server 10 connected to the scanner 9 and configured to send the image data scanned by the scanner 9 to the personal computers selected as the transmission destination.

In a case where the feature of the scanner 2 is provided by the scanner 9 and the scanner server 10, only the reading portion 26 is configured to be provided in the scanner 9, and all the other portions shown in FIG. 2A are configured to be provided in the scanner server 10.

As described above, in the data processing system 1 according to the embodiment, each personal computer sends a packet to the scanner 2 in a state in which the packet contains the IP address of the personal computer used when the scanner 2 will send image data to the personal computer. On the scanner 2 side, a personal computer as a transmission destination of image data is selected from each personal computer as a sender of the packet received from the personal computer. Accordingly, when image data generated by the scanner 2 is to be sent to a personal computer, the personal computer can be designated easily.

Furthermore, the scanner 2 is controlled to be forbidden to send image data to the personal computer unless input verification information coincident with registration verification information corresponding to the personal computer as a transmission destination of image data is entered. Accordingly, malicious intent to send image data to another user's personal computer and transmission of image data to an unintended personal computer due to mistaken selection of a personal computer can be prevented effectively.

Furthermore, the packet sent from each personal computer to the scanner 2 contains the IP address of the personal computer, and encrypted registration verification information. Accordingly, load imposed on communication can be lightened.

Furthermore, encrypted registration verification information is sent from each personal computer to the scanner 2. Accordingly, registration verification information can be prevented effectively from being leaked to other persons. Furthermore, after input verification information is encrypted by an encryption process substantially equal to the encryption process used for encrypting the registration verification information, a determination is made as to whether the input verification information and the registration verification information are coincident with each other or not. Accordingly, on the basis of the fact that encryption of information by the substantially same encryption process is generally easier than decryption of encrypted information, there is an advantage in that the determination can be made easily compared with the case where the determination is made as to whether the input verification information and the registration verification information are coincident with each other or not after the encrypted registration verification information is decrypted.

Furthermore, when the packet is not received from a personal computer for a predetermined time, registration information concerning the personal computer is deleted from the registration information database. Accordingly, the storage region of the NVRAM 24 can be used effectively and only personal computers from each of which the packet is received for the predetermined time by the scanner can be displayed as transmission destinations in the terminal equipment selection group. Accordingly, the user can select a transmission destination of image data easily.

Although a preferred embodiment of the invention has been described above, it is to be understood that the invention is not limited to the embodiment and that various design changes may be made within the scope of the present invention. For example, the scanner 2 used as the image data generator in the embodiment may be replaced by a digital camera or the like. Although the embodiment has been described on the case where "Scan to Email", "Scan to Image" and "Scan to OCR" are used as application softwares, the invention may be applied to the case where other application softwares such as "Scan to FAX" for faxing image data are used.

Although the embodiment has been described on the case where encrypted registration verification information is sent from each personal computer to the scanner 2 while input verification information is encrypted so that a determination is made as to whether the encrypted registration verification information and the encrypted input verification information are coincident with each other or not, the system may be configured in such a manner that registration verification information (not encrypted) is sent from each personal computer to the scanner 2 while input verification information is not encrypted so that a determination is made as to whether the registration verification information and the input verification information are coincident with each other or not.

The system may be also configured in a such a manner that encrypted registration verification information is sent from each personal computer to the scanner 2 and decrypted so that a determination is made as to whether the decrypted registration verification information and the input verification information are coincident with each other or not.

The system may be further configured as follows. That is, registration verification information is not sent from each personal computer to the scanner 2 but input verification information entered in the scanner 2 is sent from the scanner 2 to the personal computer selected by the user. The personal computer determines whether the input verification information and the registration verification information are coincident with each other or not. When the two are coincident with each other, the personal computer permits the scanner 2 to send image data to the personal computer.

The system may be further configured as follows. That is, registration verification information is not sent from each personal computer to the scanner 2 but input verification information entered in the scanner 2 is encrypted and sent from the scanner 2 to the personal computer selected by the user. The personal computer encrypts registration verification information in an encryption process substantially equal to the encryption process used for encrypting the input verification information and determines whether the encrypted input verification information and the encrypted registration verification information are coincident with each other or not. When the two are coincident with each other, the personal computer permits the scanner 2 to send image data to the personal computer.

The system may be further configured as follows. That is, registration verification information is not sent from each personal computer to the scanner 2 but input verification information entered in the scanner 2 is encrypted and sent from the scanner 2 to the personal computer selected by the user. The personal computer decrypts the encrypted input verification information and determines whether the decrypted input verification information and the registration verification information are coincident with each other or not. When the two are coincident with each other, the personal computer permits the scanner 2 to send image data to the personal computer.

The system may be further configured so that registration information stored in the registration information database can be deleted on the personal computer side.

Although the embodiment has been described on the case where the registration information database is stored in the RAM 22 or in NVRAM 24 so that registration information can be saved even in the case where the power supply of the scanner 2 is switched off, the invention may be applied to the case where the registration information database is stored in the RAM 23 so that registration information can be deleted when the power supply of the scanner 2 is switched off.

Although the embodiment has been described on the case where the determination as to whether the packet containing information for indicating an application software is to be sent to the scanner 2 is made on the basis of the determination (S101, S105, S109) as to whether the application software is installed in the HDD 34 of each personal computer, the invention may be applied to the case where the determination as to whether the packet containing information for indicating the application software is to be sent to the scanner 2 is made on the basis of a result of user's selection as to whether the application software is used or not.

Although the embodiment has been described on the case where the time-out value in the registration information database (FIG. 3A or 3B) is decreased gradually so that the registration information is deleted from the registration information database when the time-out value reaches zero (S301: YES in FIG. 7), the invention is not limited thereto. For example, the registration information may be deleted when it is not received for a week. Or all pieces of registration information may be deleted when the power supply of the scanner 2 is switched off. In short, it is preferable to prevent very old registration information from being stored permanently.

Although the embodiment has been described on the case where the registration information sending process shown in FIG. 5 starts when the power supply of each personal computer is switched on, the invention may be applied to the case where the registration information sending process starts when joining of the scanner 2 to the LAN 8 is confirmed. In this case, when the scanner 2 is joined to the LAN 8 (i.e., when the scanner 2 is connected to the LAN 8), a notice of joining of the scanner 2 to the LAN 8 is broadcast on the LAN 8 by the scanner 2. A determination as to whether the registration information sending process shown in FIG. 5 is to be executed or not, is made on the basis of a determination as to whether the broadcast notice is received or not. Incidentally, in this case, the procedure of steps S101 to S113 need not be executed repeatedly. That is, the procedure of steps S101 to S112 may be executed only when the broadcast notice is received. As a result, the number of times in transmission/reception of the packet can be reduced. According to this configuration, because transmission/reception of registration information is executed on the basis of the timing of joining of the scanner 2 to the LAN 8, there can be eliminated a useless process of sending the packet to the scanner 2 when the scanner 2 is not joined to the LAN 8.

The respective programs used in the scanner 2 and each personal computer for executing the aforementioned processes may be recorded in any kind of recording medium such as a CD-ROM that can be read by each computer.

As described above, in the image data processing system 1 according to the embodiment, a personal computer to which image data will be sent and an application software for processing the image data are selected individually. Accordingly, a personal computer to which image data will be sent and an application software for processing the image data can be selected easily compared with the case where a personal computer to which image data will be sent and an application software for processing the image data are selected as a combination.

The names of interfaces through which personal computers are local-connected to the scanner 2 are displayed in the terminal equipment selection group when the user is informed of the personal computers local-connected to the scanner 2. Accordingly, the user can select a personal computer to which the image data will be sent, while recognizing the names of interfaces through which personal computers local-connected to the scanner 2 or while specifying terminal equipments on the basis of the names of interfaces.

Furthermore, the registration information database is updated on the basis of registration information sent from each personal computer to the scanner. Accordingly, a personal computer newly enabled to communicate with the scanner 2 and application softwares installed in the personal computer can be added as options.

Furthermore, only personal computers registered so as to be linked to an application software selected from the application software selection group are displayed in the terminal equipment selection group so that a personal computer registered so as to be linked to the selected application software can be selected. Accordingly, the number of options can be reduced so that a personal computer to which the image data will be sent can be selected easily.

Furthermore, only application softwares registered so as to be linked to a personal computer selected from the terminal equipment selection group are displayed in the application software selection group so that an application software registered so as to be linked to the selected personal computer can be selected. Accordingly, the number of options can be reduced so that an application software for processing the image data can be selected easily.

Furthermore, after one smaller in number is first selected from the terminal equipment selection group and the application software selection group on the basis of the result of comparison between the number of personal computers in the terminal equipment selection group and the number of application softwares in the application software selection group, selection is made from the other selection group having options corresponding to the option selected from one selection group. Accordingly, the number of options can be reduced more greatly, so that user's load on selection of a personal computer to which the image data is sent and selection of an application software for processing the image data can be lightened.

Although the embodiment has been described on the case where the names of interfaces through which personal computers are local-connected to the scanner 2 are registered as transmission destinations in the registration information database so that only the names of interfaces are displayed in the terminal equipment selection group when the personal computers are local-connected to the scanner 2, the invention may be applied to the case where the names of personal computers local-connected to the scanner 2 and the names of interfaces through which the personal computers are local-connected to the scanner 2 are registered in the registration information database so that the names of personal computers and the names of interfaces are displayed in the terminal equipment selection group.

Although the embodiment has been described on the case where the number of transmission destinations stored in the registration information database are compared with the number of application softwares stored in the registration information database so that selection is first made from the selection group larger in number, the invention is not limited thereto but may be configured as follows.

For example, the names of transmission destinations stored in the registration information database may be displayed so that a transmission destination can be selected. The user selects a personal computer as a transmission destination of image data on the basis of the display. When a personal computer as a transmission destination is selected by the user, the names of application softwares (application softwares allowed to be used in the selected personal computer) stored in the registration information database so as to be linked to the selected personal computer are displayed so that an application software can be selected. The user selects an application software for processing the image data on the basis of the display.

Or the names of application softwares stored in the registration information database are displayed so that an application software can be selected. The user selects an application software for processing the image data on the basis of the display. When an application software for processing the image data is selected by the user, the names of transmission destinations (information concerning personal computers allowed to use the selected application software) stored in the registration information database so as to be linked to the selected application software are displayed so that a personal computer can be selected as a transmission destination. The user selects a personal computer to which the image data will be sent, on the basis of the display.

Although the embodiment has been described on the case where registration information (the name of each transmission destination, information of each application software, IP address, port number and time-out value) is sent from each personal computer to the scanner on the basis of the registration information sending process carried out by the personal computer as shown in FIG. 5, so that the registration information database shown in FIG. 3A or 3B is generated in the scanner and used for selection of a terminal equipment and selection of an application software, the invention is not limited thereto but may use another method.

For example, unlike the aforementioned configuration, registration information containing the name of each transmission destination, information of each application software, IP address, port number and time-out value need not be sent at once. That is, registration information may be sent while divided into registration information (the name of each transmission destination, IP address, port number, etc.) concerning each terminal equipment and registration information (information of each application software, etc.) concerning each application software. In this case, registration information concerning each terminal equipment may be first sent from each personal computer to the scanner. When a terminal equipment is selected on the scanner side, the scanner may send an inquiry to the selected terminal equipment on the basis of information contained in the registration information. Registration information concerning each application software may be obtained by the inquiry so that an application software can be selected on the basis of the registration information.

The configuration described above will be described in detail hereinbelow. A registration information sending process shown in FIG. 15 and an image data processing shown in FIG. 16 are executed instead of the registration information sending process shown in FIG. 5 and the image data processing shown in FIG. 8 in the aforementioned embodiment. (Other processes based on the drawings are substantially the same and the detailed description thereof will be omitted). That is, when each of the personal computers 3, 4, 5a, 5b and 5c is powered on, the CPU 31 of each of the personal computers 3, 4, 5a, 5b and 5c reads a registration information sending program from the HDD 34 to execute the registration information sending process shown in FIG. 15. First, in step S801, the CPU 31 generates registration information (<IP address of its own device>:<port number>:<name of its own device (name of transmission destination stored in "Transmission Destination" of the registration information database)>) concerning each terminal equipment and controls the personal computer to send the generated registration information concerning each terminal equipment to the scanner 2. Incidentally, the registration information database updated by the process shown in FIG. 6 contains no information concerning each application software because the scanner 2 receives the registration information concerning each terminal equipment.

Then, in step S802, the CPU 31 determines whether an inquiry made about available application software in step S904 which will be described later is received from the scanner 2 or not. When the CPU 31 makes a decision that the inquiry is received (S802: YES), the current position of the process goes to step S803. On the other hand, when the CPU 31 makes a decision that the inquiry is not received (S802: NO), the CPU 31 repeats the step S802 to monitor the inquiry about application software.

In the step S803, the CPU 31 executes a procedure substantially equal to the procedure of the steps S101 to S106 shown in FIG. 5 (except that registration information generated and sent to the scanner 2 is registration information concerning each application software). That is, the CPU 31 generates registration information (<IP address of its own device>:<information indicating each application software>) concerning each application software and controls the personal computer to send the generated registration information concerning each application software to the scanner 2.

Figure 15:
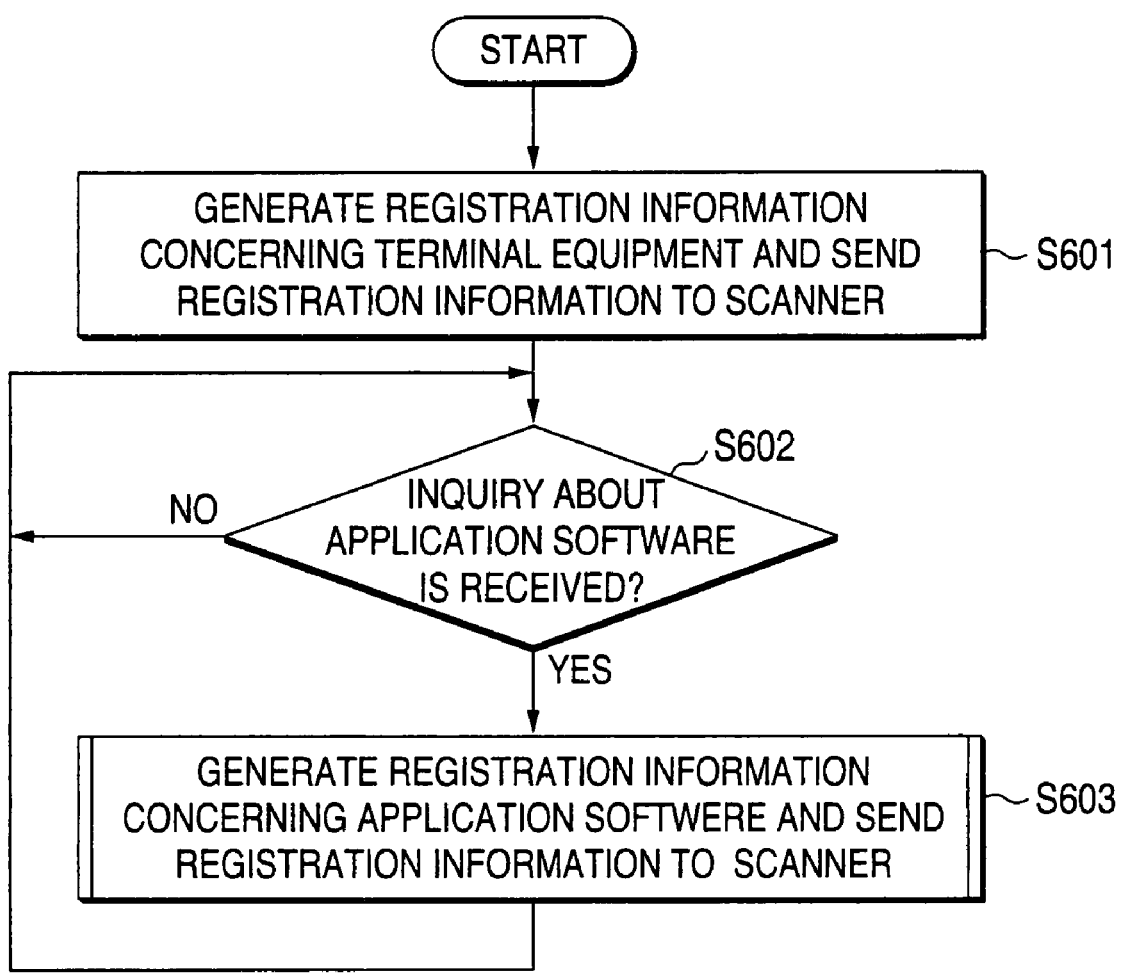
FIG. 15 is a flow chart showing an operation flow of sending registration information to a scanner.
Figure 16:
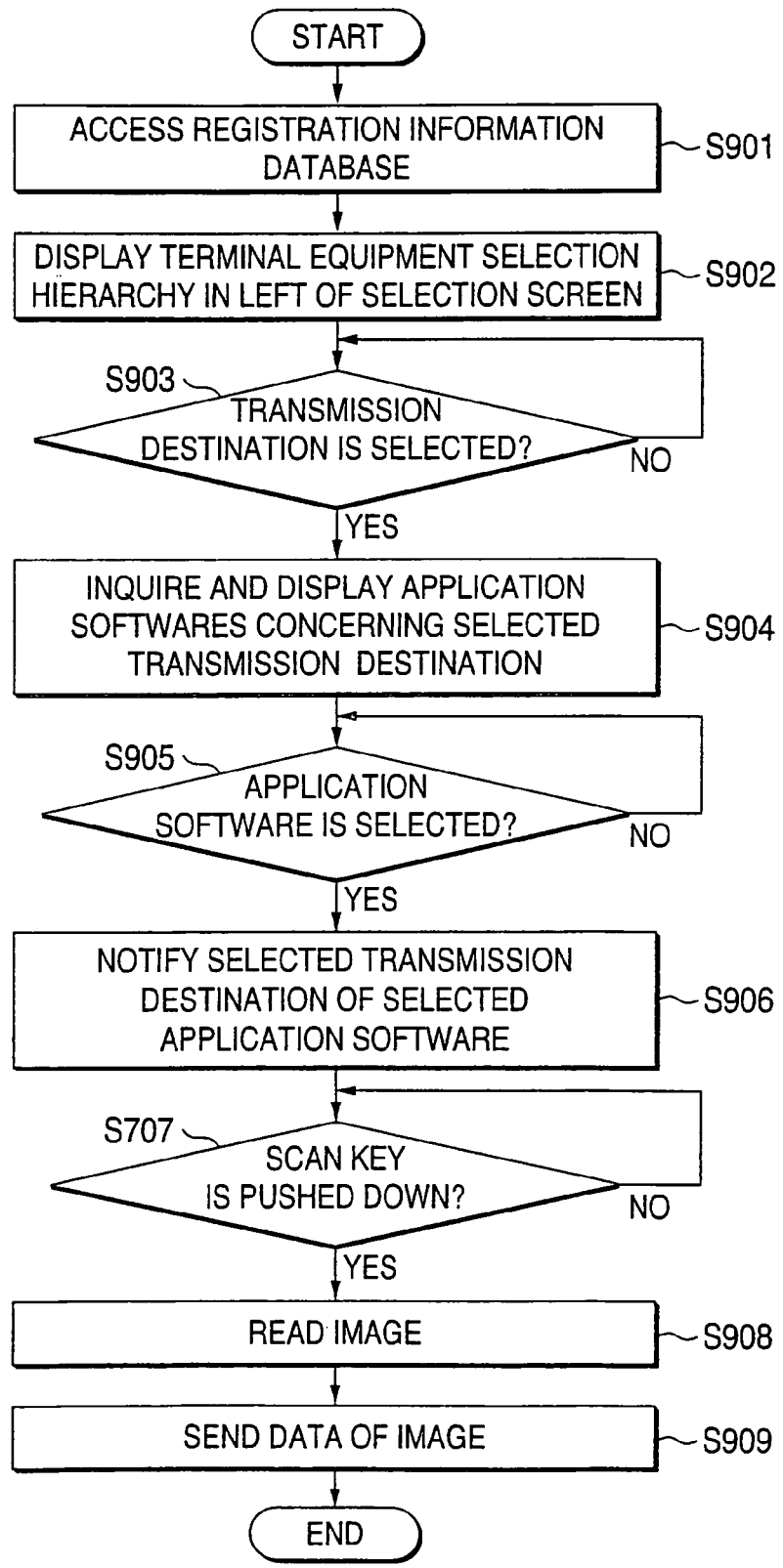
FIG. 16 is a flow chart showing an operation flow of processing the image data.
Figure 17:
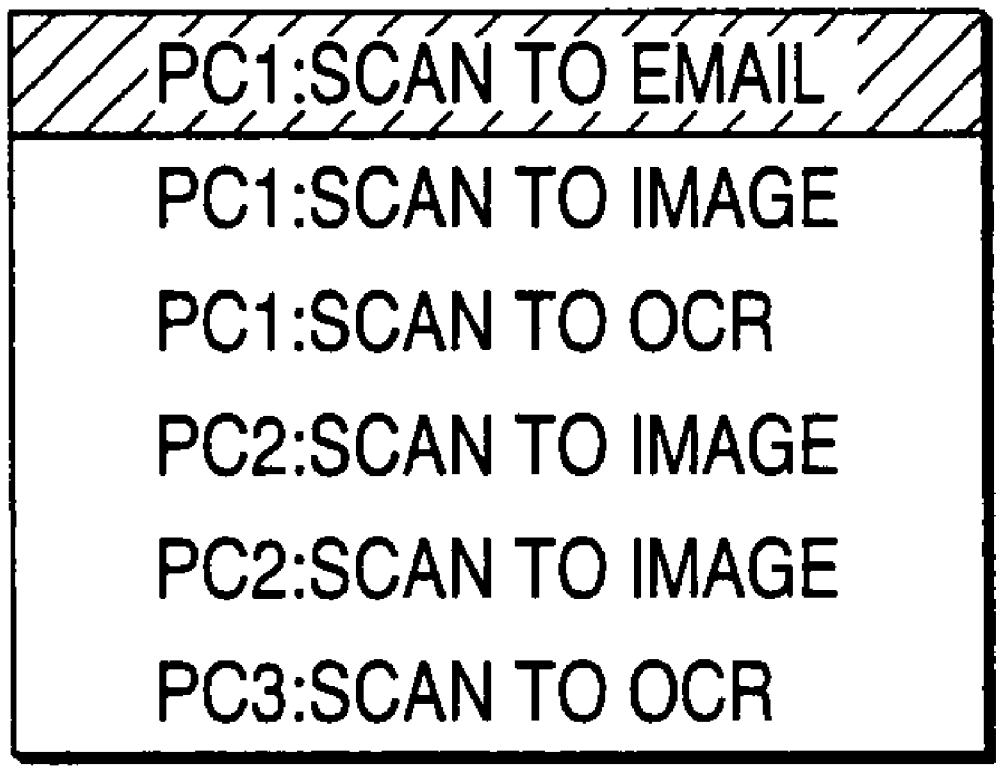
FIG. 17 is a view showing an example of a selection screen displayed on the scanner included in the data processing system.

On the other hand, when the user makes a predetermined key operation on the operation panel 25 of the scanner 2, the CPU 21 of the scanner 2 reads an image data processing program from the ROM 22 to execute the image data processing shown in FIG. 15. In the image data processing, a procedure substantially equal to the procedure of the steps S401, S407, S408, S409, S410, S411, S412, S413 and S414 shown in FIG. 8 (except that the procedure in the step S409 is different from the procedure in the step S904 as will be described later) is executed by steps S901, S902, S903, S904, S905, S906, S907, S908 and S909 in FIG. 16.

The step S904 is however largely different from the step S409. In the step S904, the registration information concerning each terminal equipment and stored in the registration information database is used so that an inquiry about application software allowed to be used in the personal computer is sent to the personal computer (terminal equipment) selected in the step S903 (inquiry unit). Accordingly, in the step S803, a notice of application softwares allowed to be used in the personal computer is sent from the personal computer to the scanner 2 on the basis of the registration information concerning each application software. The scanner 2 displays a selection screen, for example, a selection screen as shown in FIG. 4B or 4D, on the operation panel 25 on the basis of this notice.

According to the configuration described above, management can be made easily because the relation between personal computers (terminal equipments) and application softwares allowed to be used in the personal computers need not be registered in the registration information database. In addition, load imposed on the memory can be lightened because the system can be formed so that only registration information concerning each terminal equipment is stored.

As described above, in the data processing system 1 according to the embodiment, the scanner 2 sends image data after the scanner 2 receives a notice of permission of sending of the data from each of the personal computers 3, 4, 5a, 5b and 5c. Accordingly, a user's simple operation can be made to prevent each of the personal computers 3, 4, 5a, 5b and 5c from receiving image data unintended by the user.

Furthermore, because the notice received from the scanner 2 to designate an application software to be operated in each of the personal computers 3, 4, 5a, 5b and 5c serves also as a request for a notice of permission of sending of data, reduction in traffic density can be attained. Furthermore, because the notice of permission of sending of data is sent to the scanner 2 after the application software is checked on the side of each of the personal computers 3, 4, 5a, 5b and 5c, the mistaken designation of the application software on the scanner 2 side can be found.

Furthermore, sending of an e-mail with image data, editing of image data or recognition of characters from image data can be performed on the side of each of the personal computers 3, 4, 5a, 5b and 5c.

Furthermore, because the scanner 2 includes storage devices such as the RAM 23 and the HDD 30, the system can be simplified.

In addition, because the user designates a specific one of the personal computers 3, 4, 5a, 5b and 5c and an application software from the personal computer selection group and the application software selection group displayed on the scanner 2 on the basis of user's operation, mistaken sending of data caused by mistaken designation can be reduced.

Furthermore, a plurality of pieces of image data to be sent by the scanner 2 can be stored in the HDD 30. Accordingly, while the scanner 2 waits for the notice of permission of sending of data from each of the personal computers 3, 4, 5a, 5b and 5c, the scanner 2 can generate another image data.

In addition, when the notice to designate an application soft is received, the user can select whether a notice of permission of sending of data is performed on the basis of a check dialog box or not. Accordingly, security can be improved by a simple operation of selection.

Furthermore, because a point of time when sending of image data will start can be designated, data can be received at a point of time convenient for the side of each of the personal computers 3, 4, 5a, 5b and 5c.

Although the embodiment has been described on the case where image data generated by the scanner 2 is processed, the invention is not limited thereto but may be also applied to the case where another application data such as motion picture data, voice data, or text data are processed.

Although the embodiment has been described on the case where the notice of registration information of an application software from the scanner 2 serves also as a request for a notice of permission of sending of data, the invention is not limited thereto but may be also applied to the case where the notice of registration information of an application software is provided separately from sending of the request for a notice of permission of sending of data.

Although the embodiment has been described on the case where the registration information database is stored in the RAM 23 of the scanner 2, the invention is not limited thereto. For example, a database server allowed to be accessed by communication may be prepared so that a registration information database substituted for the registration information database stored in the RAM 23 of the scanner 2 is stored in the database server or so that one of the registration information database for personal computers and the registration information database for application softwares is stored in the RAM 23 of the scanner 2 while the other registration information database is stored in the database server. The invention may be also applied to the case where no registration information database is used. In this case, identification information of each personal computer and identification information of each application software may be input individually.

Although the embodiment has been described on the case where the scanner 2 has a function for making the user select a personal computer as a transmission destination and an application software for processing image data, the invention is not limited thereto but may be also applied to the case where each personal computer other than the scanner 2 has this function. The invention may be applied to the case where neither the scanner 2 nor each personal computer has this function. Incidentally, in this case, a personal computer as a transmission destination and an application software for processing image data may be designated by setting or the like.

Although the embodiment has been described on the case where the scanner 2 has the HDD 30 for storing image data generated by the scanner 2, the invention is not limited thereto but may be also applied to the case where the scanner 2 has no storage device such as an HDD 30.

Although the embodiment has been described on the case where the determination as to whether each of the personal computers 3, 4, 5a, 5b and 5c sends a notice of permission of sending of data or not, is decided on the basis of user's entry in the check dialog box, the invention is not limited thereto but may be also applied to the case where this determination is decided on the basis of setting made in advance without user's entry requested whenever the determination is required.

Although the embodiment has been described on the case where the timing of sending of image data is designated when each of the personal computers 3, 4, 5a, 5b and 5c sends a notice of permission of sending of data, the invention is not limited thereto but may be applied to the case where the timing of sending of image data is not designated. In this case, the scanner 2 may send image data immediately after the scanner 2 receives the notice of permission of sending of data or the scanner 2 may send image data after the scanner 2 makes each of the personal computers 3, 4, 5a, 5b and 5c send a command for requesting sending of image data and receives the command from each of the personal computers 3, 4, 5a, 5b and 5c.

Although the embodiment has been described on the case where the system includes personal computers 3 and 4 connected to the scanner 2 through USB I/F and parallel I/F of the scanner 2, and personal computers 5a, 5b and 5c connected to the scanner 2 through the LAN 8, the invention is not limited thereto but may be applied to the case where the system includes only personal computers connected to the scanner 2 through USB I/F and parallel I/F of the scanner 2 or to the case where the system includes only personal computers connected to the scanner 2 through the LAN 8.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data processing method used for a data processing system that comprises a scanner connectable to one or more personal computers, wherein the scanner performs the steps of:
   generating data;
   displaying information concerning one or more selectable personal computers as a transmission destination of the data;
   selecting a personal computer from the displayed information concerning selectable personal computers;
   displaying information concerning selectable application software for executing the data;
   selecting application software from the displayed information concerning selectable application software;
   sending a notice of the selected application software to the selected personal computer; and
   sending the data to the selected personal computer,
   whereby the selected personal computer is allowed to process the data by use of the application software designated by the notice.

2. The data processing method according to claim 1, wherein, in said displaying information concerning application software, information concerning executable application software at the selected personal computer is displayed.

3. The data processing method according to claim 2, further comprising:
   receiving information concerning installed application software from a connected personal computer,
   wherein the information concerning executable application software at the selected personal computer contains the information concerning installed application software received from the selected personal computer.

4. The data processing method according to claim 3, further comprising:
   storing the received information concerning the installed application software in association with information concerning the personal computer that is a transmission source of the received information.

5. The data processing method according to claim 1, further comprising:
   sending a request for permitting a transmission of the data to the selected personal computer before performing said sending the data to the selected personal computer,
   wherein said sending the data to the selected personal computer is performed when the selected personal computer permits the data transmission.

6. The data processing method according to claim 1, wherein said sending the generated data to the selected personal computer is performed after said sending the notice of the selected application software to the selected personal computer.

7. The data processing method according to claim 1, further comprising:
   receiving personal computer information from a connected personal computer when there is application software executable at the connected personal computer,
   wherein said sending the notice of the selected application software and said sending the data to the selected personal computer is performed based on the received personal computer information.

8. The data processing method according to claim 1, wherein said displaying the information concerning selectable personal computer comprises:
   displaying a name of the selectable personal computer when the personal computer is connected to the selectable personal computer via network; and
   displaying a name of an interface used in a local connection when the personal computer is local-connected to the selectable personal computer.

9. The data processing method according to claim 1, further comprising
   processing the data by use of the application software designated by the notice at the selected personal computer.

10. The data processing method according to claim 1, wherein the scanner is configured to read an original and generate image date of the original.

11. A scanner comprising:
   a reader configured to read an original;
   a display configured to display information; and
   a processor that is programmed to:
      generate data based on the read original,
      display, on the display, information concerning one or more selectable personal computers as a transmission destination of the data,
      select a personal computer from the displayed information concerning selectable personal computers,
      display, on the display, information concerning selectable application software for executing the data,
      select application software from the displayed information concerning the selectable application software,
      send a notice of the selected application software to the selected personal computer, and
      send the data to the selected personal computer.

12. The scanner according to claim 11, wherein, in the displaying information concerning application software, information concerning executable application software at the selected personal computer is displayed.

13. The scanner according to claim 11, wherein the generated data is sent to the selected personal computer after the notice of the selected application software is sent to the selected personal computer.

* * * * *